United States Patent
Klabunde et al.

[11] Patent Number: 6,045,925
[45] Date of Patent: Apr. 4, 2000

[54] ENCAPSULATED NANOMETER MAGNETIC PARTICLES

[75] Inventors: Kenneth J. Klabunde; Dajie Zhang; Christopher Sorensen, all of Manhattan, Kans.

[73] Assignee: Kansas State University Research Foundation, Manhattan, Kans.

[21] Appl. No.: 08/906,027

[22] Filed: Aug. 5, 1997

[51] Int. Cl.⁷ .............................. B32B 5/16; B32B 15/20; B22F 7/04; B05D 3/02

[52] U.S. Cl. ........................ 428/548; 427/216; 427/217; 427/255.2; 427/376.1; 427/376.8; 427/383.7; 428/328; 428/330; 428/332; 428/403; 428/558; 428/570; 428/611; 428/615; 428/640; 428/650; 428/655; 428/666; 428/668; 428/672; 428/673; 428/674; 428/680; 428/681; 428/686

[58] Field of Search ................................. 428/548, 558, 428/570, 611, 615, 639, 640, 650, 655, 668, 669, 672, 673, 674, 680, 681, 686, 328, 332, 339, 403, 330, 666; 427/216, 217, 255.2, 376.1, 376.8, 383.7

[56] References Cited

U.S. PATENT DOCUMENTS

| | | | |
|---|---|---|---|
| 4,578,115 | 3/1986 | Harrington et al. | 75/255 |
| 4,588,708 | 5/1986 | Klabunde | 502/241 |
| 4,877,647 | 10/1989 | Klabunde | 427/123 |
| 5,348,800 | 9/1994 | Moro et al. | 428/328 |
| 5,525,377 | 6/1996 | Gallagher et al. | 427/512 |
| 5,633,092 | 5/1997 | Gibbs | 428/611 |

OTHER PUBLICATIONS

Klabunde et al.; Encapsulated Nanoparticles of Iron Metal; *Chem. Mater.*, vol. 6,No. 6, 784–787 (1994).

Zhang et al.; Synthesis and Characterization of Encapsulated Nanoscale Magnetic Metal Particles; *Cryosynthesis*, Second Internat'l Conference on Low Temperature Chemistry (1996).

Zhang et al.; Synthesis of Nanoscale Magnetic Metal Particles Encapsulated in Magnesium Fluoride and the Properties of These Materials; *High Temperature and Materials Science*, vol. 36, 135–153 (1996).

Zhang et al.; Nanoscale Iron Crystallites Encapsulated in Nonmagnetic Metal Shells; *High Temperature and Materials Science*, vol. 36, 93–115 (1996).

Easom et al.; Nanoscale Magnetic Particles. New Methods to Surface Protected Metallic and Immiscible Bimetallic Clusters/Particles; *Polyhedron*, vol. 13, No. 8, pp. 1197–1223 (1994).

*Primary Examiner*—Hoa T. Le
*Attorney, Agent, or Firm*—Hovey, Williams Timmons & Collins

[57] ABSTRACT

Composite nanoparticles comprising an elemental metal core surrounded by a metal-containing shell material are described wherein the particles have an average diameter of from about 5–500 nm; the core metal is preferably selected from the group consisting of the transition metals and especially Fe, Co and Ni, whereas the shell material is advantageously a metal such as an alkaline earth metal, or a metal salt such as a metal oxide or metal halide. The shell material is preferably more oxophilic than the elemental core material, enabling the core metal to remain purely metallic. These core/shell composite particles can be used to fabricate magnetizable recording media such as tapes and disks.

35 Claims, 21 Drawing Sheets

$Co_{vapor} + MgF_{2\,vapor} + pentane_{vapor} \xrightarrow{77K}$ removal of pentane → heat treatment →

ENCAPSULATED NANOMETER MAGNETIC PARTICLES

BACKGROUND OF THE INVENTION

1. Field of the Invention

The present invention is broadly concerned with novel nanoscale polymetallic composite particles, as well as magnetic recording media (e.g., flexible tapes and rigid disks) and integrated circuits using polymetallic nanoscale particles. More particularly, the invention pertains to such composite particles and end products wherein, in preferred forms, the nanoscale composite particles have an average diameter of from about 5–500 nm with an elemental metal core surrounded by a metal-containing shell material.

2. Description of the Prior Art

U.S. Pat. Nos. 4,588,708 and 4,877,647 describe catalyst and metallic coatings made by the Solvated Metal Atom Dispersion (SMAD) process. This method utilizes metal vapors (i.e., atoms) that are produced by heating pieces of elemental metal in a high temperature crucible up to the vaporization point of the metal while under vacuum. The metal vapor is condensed on the inside walls of the vacuum vessel which is cooled to a very low temperature. At the same time the vapors of an organic solvent are codeposited with the metal vapor on the low temperature vessel wall, forming a frozen matrix. After the codeposition, the frozen matrix contains metal atoms, atomic oligomers such as dimers, trimers and small metal clusters. Upon warming, the atoms and oligomers begin to migrate and bond to each other to form metal particles of various sizes, dependent upon the concentration of the metal atoms in the solvent, the chemical structure of the solvent, warm-up rate, and other parameters. Two important facets of this process are: (1) as the clusters grow they become heavier and less mobile, and (2) as the clusters grow solvent binds to the cluster surface and tends to slow further growth. Thus, the SMAD process yields metal clusters/particles in a solvent medium free of extraneous reagents.

It has also been known to employ SMAD processes for the fabrication of core/shell metallic composite particles where elemental metal particles are encapsulated within a metallic shell material. For example, metastable Fe-Mg core/shell composite particles are described by Klabunde et al. (*Chem. Mater.*, Vol. 6, No. 6, 1994). Additionally, codeposition of Fe and Ag has been attempted, but the method failed to yield core/shell particles, resulting mainly in separate Se and Ag particles (Easom et al., *Polyhedron*, Vol. 13, No. 8, 1994). The key to producing metallic core/shell composites is to choose combinations of metals that are not normally thermodynamically miscible. The SMAD process forces atoms of the immiscible elements to combine at low temperatures, so that metastable alloy composite particles form. Upon heating of these particles, controlled phase segregation can be accomplished since there is a natural tendency for the two elements to separate. Although it cannot be predicted which metal will nucleate and form the core, and which will form the shell, experience has shown that the metal possessing the stronger metal-metal bonds will generally form the core material.

A major driving force behind the study of nanoscale ferromagnetic particles is the search for improved magnetic recording materials useful in magnetic recording and the like. In such applications, the ferromagnetic particles should be a single domain unit that possess two stable opposite magnetic poles along a preferred axis. The switching field is the minimum magnetic field needed to switch the magnetic poles in the single domain particles. The size of the switch units (single domain particles) is important in the performance of the recording medium. They should be small enough to allow recording of the intended magnetization pattern and to provide a high signal-to-noise ratio, which requires the use of small switch units that are partially independent, so that one unit is not strongly affected by the magnetization of the other units. Additionally, a magnetic recording medium must be chemically stable under the conditions of use. For this reason, metallic Fe, Co, or Ni, being extremely oxophilic in ultrafine particle form, are generally not useful. Instead, iron oxide, chromium oxide, barium ferrite and cobalt-enhanced iron oxide are most commonly employed. However, such metal oxides have relatively low magnetization intensities and are therefore not optimum for recording materials. On the other hand, elemental iron has a magnetization intensity of 1700 emu/$cm^3$, which is several times that of the oxides. Accordingly, elemental iron would be admirably suited for use in recording media if the oxophilic properties thereof could be appropriately controlled.

SUMMARY OF THE INVENTION

The present invention overcomes the problems outlined above and provides novel polymetallic (especially bimetallic) composite particles having an average diameter of from about 5–500 nm (more preferably from about 10–100 nm and most preferably from about 15–60 nm) with an elemental metal core surrounded by a metal-containing shell material; the core and shell material are thermodynamically immiscible and each is evaporable at a temperature of up to about 2000° C. under a vacuum. The shell material is preferably non-magnetic and selected from the group consisting of In, Nd and metal salts; in many instances, the metal moiety of such salts is different than the core metals. Preferred metal salts are the metal oxides and halides, particularly the fluorides.

In preferred forms, the core fraction of the composite particles is present at a level of at least about 30% by weight, more preferably from about 30–90% by weight, most preferably from about 50–70% by weight. Correspondingly, the shell material is present at a level of up to about 70% by weight, more preferably from about 10–70% by weight, and most preferably from about 30–50% by weight. Core metals are normally selected from the group consisting of the transition metals, and especially Fe, Al, Mg, Cr, Co, Ni, Pd, Au, Cu, and Ag. The shell material may be an elemental metal such as an alkaline earth metal, or a metal salt; the metal salts are normally selected from the group consisting of the metal oxides, sulfides and halides, especially the metal fluorides. The composites are preferably formed by co-condensation of vapors of the core elemental metal and the metallic shell material, followed by heating of the condensate. A conventional SMAD reactor can be used for this purpose. Generally speaking, the core metal and metallic shell material are heated to their respective vaporization temperatures in individual crucibles within the SMAD reactor under a vacuum of at least about 10–3 Torr. The exterior walls of the SMAD reactor are typically cooled to a temperature of about −100° C. and lower.

The magnetic recording media of the invention are generally flexible tape or rigid disk media. The tapes comprise an elongated web of synthetic resin substrate material having a magnetic coating applied to at least one face thereof. The magnetic coating includes a synthetic resin binder with magnetizable particles dispersed therein, the particles being of the type described above with an elemental core surrounded by a metal-containing shell material. The core and shell material are thermodynamically immiscible and each is evaporable at a temperature of up to about 2000° C. under a vacuum. The magnetizable particles have two stable opposite magnetic poles switchable under the influence of an externally applied magnetic field.

In this context, the core metal is preferably selected from the group consisting of Ni, Fe, Cr, and Co, whereas the metallic shell material is selected from the group consisting of non-magnetic elemental metals and metal salts (e.g., elemental lithium, magnesium and gold, and magnesium fluoride). Advantageously, the shell material should be more oxophilic than the elemental core metal so that any trace oxygen is scavenged. Moreover, the shell material should be inert and essentially impermeable to oxygen and other environmental gases. This enables the core metal to remain purely metallic in use and inhibits formation of deleterious oxides.

In the fabrication of flexible magnetic recording media, the substrates can be selected from a wide variety of materials such as polyethylene terephthalates, polyethylene napthalates, aramids and polyimids. These substrates would typically have a thickness of from about 1–10 thousandths of an inch. The magnetic coatings applied to the substrates are fabricated by mixing the magnetic particles in synthetic resin binders such as those selected from the group consisting of the polystyrenes, vinyl chloride copolymers, vinylidene chloride copolymers, polyvinyl acetate resins, acrylate and methacrylate resins, polyurethane elastomers, modified cellulose derivatives, epoxy and phenoxy resins, polyamids and combinations of polyethers with —OH groups with polyesters and polyisocyanates. Such magnetic coatings can have from about 1–80% by weight loading of magnetic particles, more preferably from about 3–60% by weight, and most preferably from about 5–30% by weight.

Rigid magnetic disks may be prepared by applying a coating made up of a synthetic resin (for example, phenol-formaldehyde, urea-formaldehyde, epoxy, polyvinyl acetate and silicone resins) with the above described magnetic particles to a rigid disk (e.g., made of aluminum or other suitable material); the particle loading in such coatings are the same as used in the fabrication of flexible web media.

DETAILED DESCRIPTION OF THE PREFERRED EMBODIMENT

Figure 1:
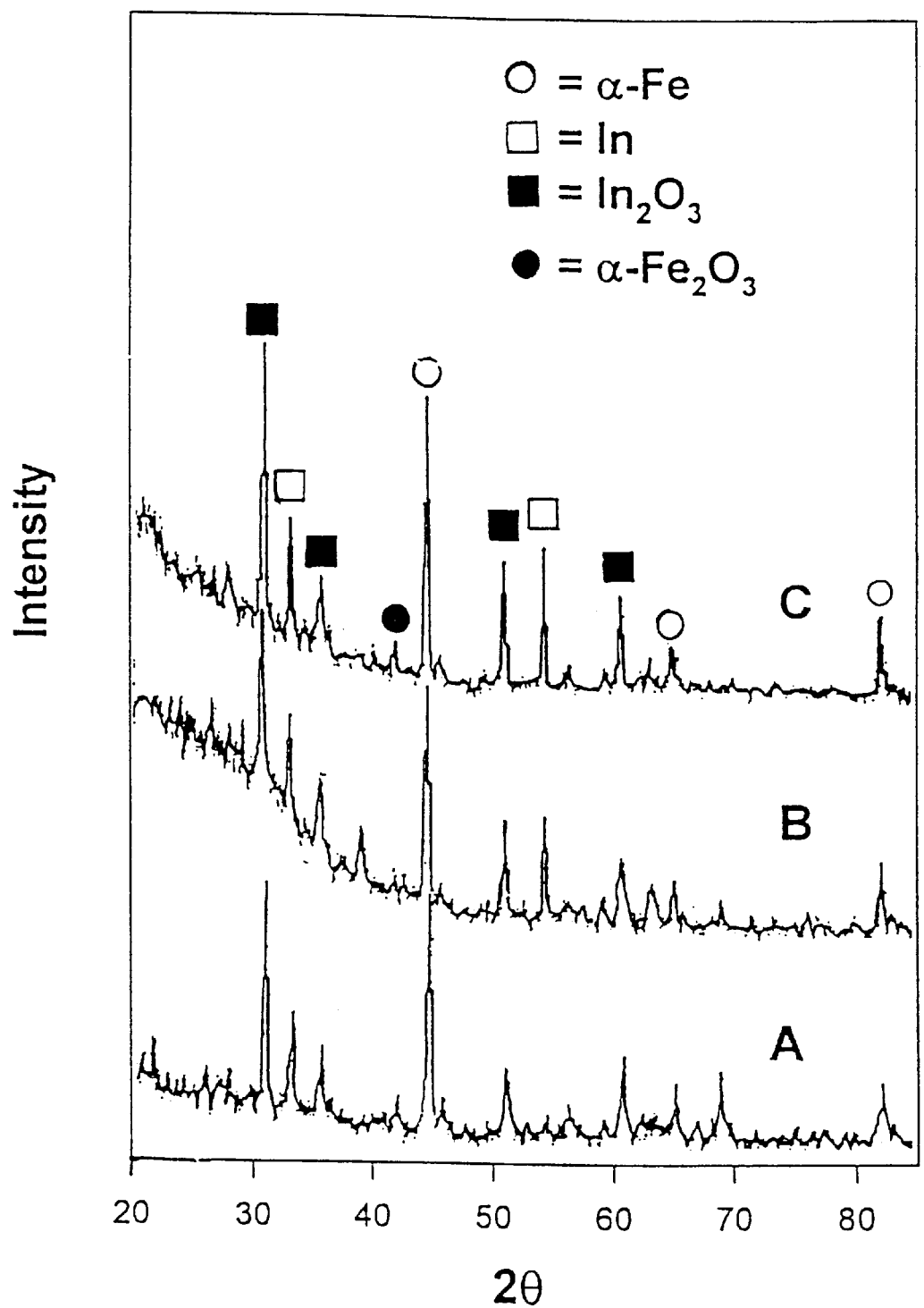
FIG. 1 is a powder X-ray diffraction pattern for Fe—In SMAD particles (Fe:In molar ratio=1:1) heat treated at (A) 400° C., (B) 600° C. and (C) 700° C. for 2 hrs. followed by oxidative passivation.

The following examples set forth preferred methods in accordance with the invention. It is to be understood, however, that these examples are provided by way of illustration and nothing therein should be taken as a limitation upon the overall scope of the invention. In these examples, the following preferred method is used for preparation and determination of the characteristics of the samples therein:

Methods and Materials

A. Equipment

1. X-ray powder diffraction: SCINTAG 3000 XRD diffractometer

X-ray powder diffraction (XRD) was used to study the chemical compositions and structures of the powders. For samples with a fresh surface, degassed mineral oil was applied to coat the sample for temporary protection from oxidation by forming a powder/oil paste in an argon-filled dry-box. XRD analysis (which lasts for about one hour) was carried out immediately after the coating because the protection from mineral oil was effective for only a few hours. For samples with passivated surfaces, no such precaution was taken.

X-ray powder diffraction was also used to estimate the crystallite sizes of the core metal particles. This was achieved with the aid of the Scherrer formula:

$$t=0.91\lambda/B_\chi oo\theta_B$$

where $\lambda$ is the X-ray wavelength, t is the crystallite diameter in Å, B is the width of the peak at half height, and $\theta_B$ is the half value of the peak position in degrees.

2. BET Surface Area: Micrometrics Flowsorb II 2300 BET

The direct information from BET measurement is the surface area of the particles. Under assumed conditions, such as the particles were spherically shaped and individually spaced, the average size of the particles were calculated from the specific surface area data, as follows: Given a group of spherical particles N with the total mass of M, the average specific area of these particles is:

$$S=(N)(4\pi R^2)/M$$

where R is the average radius of these particles. Since M is equal to $N(4/3)\pi R^3\rho$ where $\rho$ is the average density of the particles, the term $(4/3)\pi R^3\rho$ is the average mass of the particles. Thus, $$S=N(4\pi R^2)/N(4/3)\pi R^3\rho$$

S=3/R$\rho$
and R=3/S$\rho$,
therefore, the average BET size t of the particles is:
t=2r=6/S$\rho$.

3. Transmission Electron Microscopy (TEM)

Both the overall particle sizes and the core metal crystallite sizes were estimated from TEM studies. 3–5 mg of each sample was placed in a sample vial containing toluene, and agitated for 3–5 minutes in a sonicator thereby forming a suspension of the particles. One drop of the test suspension was transferred onto a carbon-coated copper grid as the sample holder. After evaporation of the solvent, the sample was ready for TEM study. To avoid sintering of the particles caused by the heat generated by the electron beam, liquid nitrogen was used to cool the sample chamber (−196° C.).

4. Mössbauer Spectroscopy

The Mössbauer spectra were obtained on a Ranger Scientific Inc. MS-1200 Mössbauer spectrometer. Mössbauer spectroscopy was used to study the oxidation states and the fine structures (e.g., core metal crystallite size, surface/interface effect on the Mössbauer parameters of the core metal) of core metal species in the samples. Approximately 5–10 mg of elemental core metal was required to obtain Mössbauer spectra for each sample. Thus, the corresponding amount of sample required in each study was estimated based on the mass balance of the sample. Like the XRD studies, samples with fresh surfaces were protected with mineral oil before being transferred into the sample chamber. Mössbauer spectra were taken at both room temperature (298 K) and liquid nitrogen temperature (77 K).

5. SQUID Magnetometry

Magnetic properties of the samples were taken from a MPMS2 (Magnetic Property Measurement System) SQUID (Superconducting Quantum Interference Device) magnetometer designed by Quantum Design. The field range of the equipment was ±55,000 Oe, with a sensitivity of $10^{-8}$ emu. Fresh samples were protected in mineral oil in a gel capsule during the measurement. Magnetization curves of these samples were taken at different temperatures between 10 K and 300 K in fields up to 55,000 Oe.

B. Solvated-Metal-Atom-Dispersion (SMAD) Method with Immiscible Metals

This method involved the codeposition of a metallic shell material (e.g., In or $MgF_2$) with a core metal (such as Fe) as well as the simultaneous deposition at 77 K of an excess of a hydrocarbon diluent (solvent) as described by Klabunde et al., *J Am. Chem. Soc.*, 98 (1979), *Free Atoms, Clusters, and Nanoscale Particles*, Academic Press (1994), *Active Metals—Preparation, Characterization, Applications*, VCH Publ., 237 (1996), incorporated by reference herein. Briefly, the SMAD apparatus comprises a vacuum flask provided with ajacket for liquid nitrogen cooling. The center of the flask is equipped with electric crucibles independently controlled for vaporizing the core metal and the metallic shell material, and with an inlet for the solvent. In the operation of the apparatus, the solvent vaporizes on entry, and then condenses on the inner walls of the flask together with the vaporized core metal and metallic shell material atoms. This condensation and cooling generates a frozen matrix of core metal, metallic shell material atoms and solvent which collects on the walls of the flask. Upon completion of the condensate formation, the liquid nitrogen cooling is discontinued. The flask can then be warmed to spur kinetic growth of the bimetallic particles. The metastable particles are then isolated and heat treated to cause phase segregation into core/shell composite particles. In order to be successful, the metallic shell material must be inert toward the core metal atoms and growing clusters, and be capable of protecting the encapsulate core metal clusters from air oxidation.

C. Preparation of Materials

Prior to the evaporation of a core metal and a metallic shell material, pentane was pre-dried by refluxing over Na/K with benzophenone. Before being deposited on the SMAD reactor, the dried pentane (held in a Schlenk tube) was degassed on a vacuum line with liquid nitrogen. The crucibles used were tungsten baskets obtained from R. D. Mathis Company. The tungsten baskets were coated with a water based alumina cement (Zircar Alumina Cement) obtained from Zircar Products, Inc. The Zircar Alumina Cement consisted of 70% alumina in a combination of milled fibers and sub-micro particles. Alumina cement is mildly acidic (pH 5) and forms a strong bond on removal of the water solvent. Prior to use, the coated crucibles were heated at about 100° C. in air for two hours and then heated to red hot in vacuum ($10^{-3}$ Torr) at increments of about 200° C. for two hours at each temperature, up to about 1,650° C. in order to eliminate the volatiles as well as avoid cracking of the alumina coating.

D. Preparation of Samples

Although several metals were co-evaporated in the following examples, each of the evaporations were carried out as follows:

Prior to the evaporation, the crucibles that contained the core metal (such as Fe) and the metallic shell material (such as In or $MgF_2$) were warmed up at increments of about 100° C. for about two hours at each increment to a temperature about 100–200° C. below the boiling points of the starting materials. This slow heating process effectively outgassed the starting materials, and minimized sudden vaporization surges during deposition. After the crucibles were heated, approximately 40–50 ml of pentane was deposited on the walls of the reactor. The evaporation of the core metal was initiated after a steady evaporation of the metallic shell material was achieved. The heating of the core metal was carefully controlled by slowly increasing the voltage to the crucible to prevent pressure surges in the reactor. In the whole evaporation process, a constant evaporation of the metallic shell material and a constant deposition of pentane at a rate of 2–3 ml per minute were ensured prior, during, and after the core metal evaporation. About one gram of core metal was evaporated in each experiment and about 100 ml of pentane was used. After the evaporation, an additional 40–50 ml of pentane was deposited to cover the product (about 200 ml total of liquid pentane).

After the final coating of pentane was finished, the reactor was closed off from the vacuum line. The liquid nitrogen dewar was removed to allow the reactor to warm to room temperature. Then the vacuum was re-applied to transfer the pentane to a cold trap and a black powder was obtained. The reactor was closed off from the vacuum line again and filled with argon to normal pressure. The lower part of the reactor containing the final product was quickly removed, covered with an aluminum foil, and carefully transferred into an argon-filled dry-box.

Heat treatments at various temperatures were applied to the collected SMAD particles to increase the sizes of the core metal crystallites within these particles. A certain amount of the sample, usually 70–100 mg, was transferred into a Pyrex glass tube in the argon-filled dry-box. The glass tube filled with argon was then sealed on a hydrogen/oxygen flame. After the sample was heated at the desired temperature over the desired time period, the sample tube was cut open in the dry-box and stored in a sample vial.

After the bimetallic powder sample was heat-treated, carefully controlled exposure to air (oxygen) was required to stabilize the surfaces of these particles against further oxidation (passivation). Thus, a slow oxidation procedure was used in which a sample vial containing 50 to 100 mg of the fresh SMAD sample (heat-treated or as-prepared) was transferred from the dry-box into open air. The cap was then slightly opened to allow slow diffusion of air into the vial. After a 12 to 24 hour period, the cap was removed and the sample was found to be stable against further oxidation. In some cases, the color of the sample changed slightly during this process.

EXAMPLE 1

In this example, using the preferred method described above, a sample was prepared using iron as the core metal and indium as the metallic shell material. The properties of Fe and In are shown in Table 1 as follows:

TABLE 1

Properties of Iron and Indium

|  | Units | Iron ($\alpha$-Fe) | Indium |
|---|---|---|---|
| Density | g/cm$^3$ | 7.87 | 7.31 |
| Melting Point | K | 1,808 | 429.6 |
| Boiling Point | K | 3,023 | 2,285 |
| Crystal Structure |  | bcc | tetr |
| Pauling Electronegativity |  | 1.83 | 1.7 |
| Valency |  | 2,3,4 | 2 or 3 |

About 2.6 grams of In and 1.3 grams of Fe (Fe:In molar ratio of 1:1) were co-evaporated in the presence of pentane at 77 K and $10^{-3}$ torr. After the evaporation, about 3 grams of dark powder was collected from the SMAD reactor. X-ray powder diffraction of the as-prepared sample showed a weak signal for indium, but no crystalline form of iron could be detected. A second Fe—In sample, with an Fe to In molar ratio of 2:1, was also studied. XRD of the as-prepared sample of this ratio showed iron and indium, both being nearly amorphous. It was desirable to have indium equal to or in excess of Fe in order for the indium metal to protect iron from oxidation beyond the formation of a nearly homogeneous Fe—In amorphous alloy. Therefore, the 1:1 ratio was chosen for further study.

The as-prepared sample of the Fe:In=1:1 molar ratio system was divided into several portions and transferred into Pyrex glass tubes in an argon atmosphere. After the tubes were sealed, they were heated in a tube furnace at 200° C., 300° C., 350° C., 400° C., 600° C., or 700° C. for two hours. The powders were transferred into small vials, slowly passivated, and analyzed by XRD. In the sample heated at 200° C., a strong In signal was detected while only a weak Fe signal could be seen. Although neither iron oxide nor indium oxide were present, a small peak at 2θ of 41.5° suggested the presence of $\alpha$-Fe$_2$O$_3$. After being heated at 300° C., the sample showed signals for Fe, In, $\alpha$-Fe$_2$O$_3$, and In$_2$O$_3$. For the 350° C. sample, a similar pattern was evident. In the 300° C. and 350° C. samples, the In signals and the signals of indium oxide were about the same strength.

In the case of the sample heated to 400° C., the peaks of iron became much sharper, the signals of indium oxide also appeared stronger than the samples heat-treated at lower temperatures (FIG. 1A), and there was still a weak peak for $\alpha$-Fe$_2$O$_3$ at about 41.5° of 2θ. After these particles were heated at 600° C. and 700° C., no iron oxide signals could be found even after extended exposure to air (FIGS. 1B and 1C). In the Fe—In=2:1 molar ratio system, XRD results of the heat-treated samples showed similar results.

Since Fe and In were both susceptible to oxidation, at high heat treatment temperatures more Fe atoms were driven into the center of the particles and were protected by In atoms that moved to the surfaces of the particles. During this process, the In reduced the iron oxides as well as scavenged any adventitious oxygen traces that might have been present.

Figure 2:
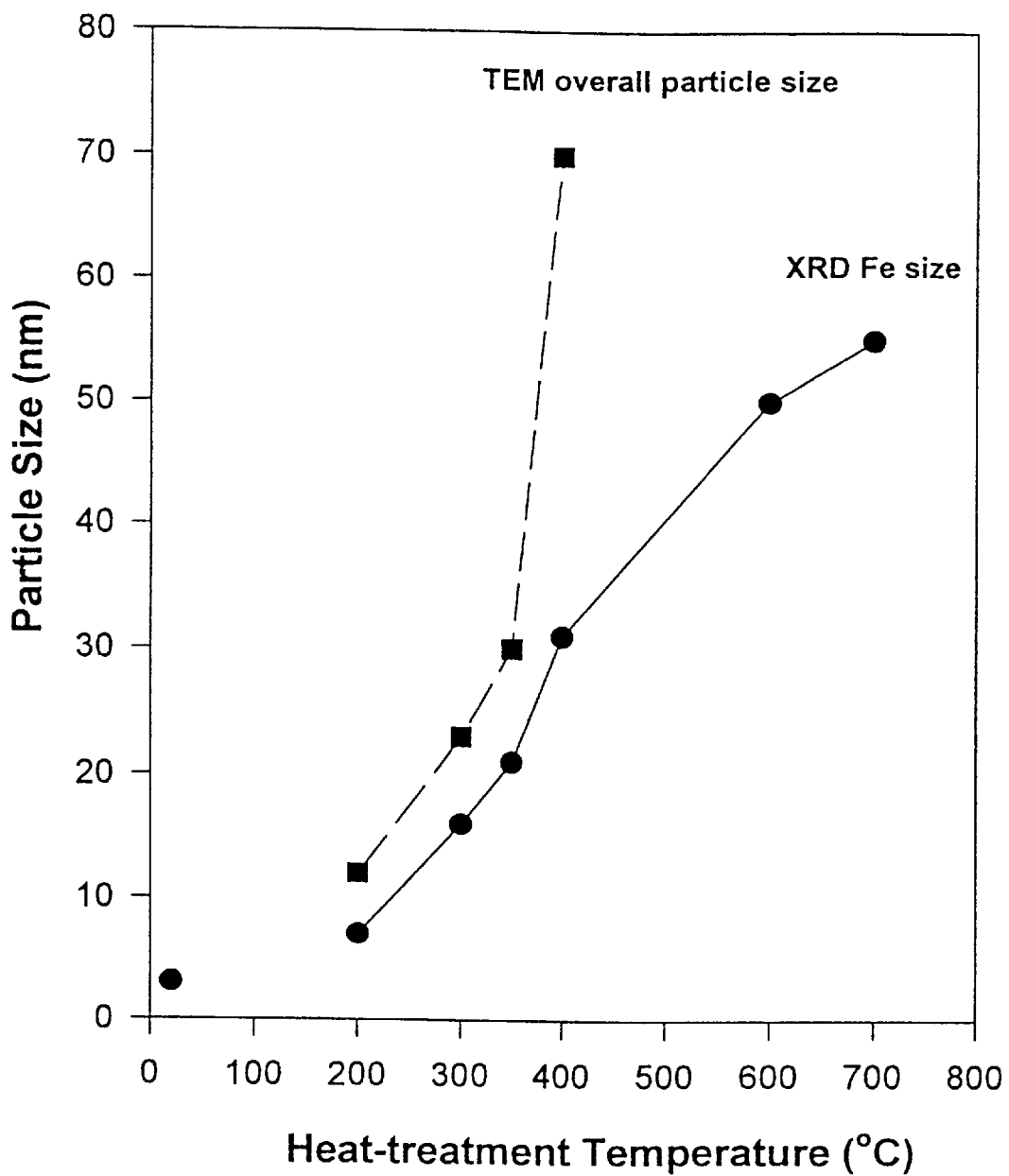
FIG. 2 is a powder X-ray diffraction pattern of iron crystallite sizes and transmission electron micrograph (TEM) overall particle sizes of Fe—In samples (Fe:In molar ratio=1:1)

XRD and TEM gave the overall sizes and Fe crystallite sizes of these core/shell composite particles. These results are summarized in FIG. 2 and Table 2.

TABLE 2

Overall Particle Sizes and Fe Crystallite Sizes of Fe-In SMAD particles obtained from TEM and XRD studies

| Sample Molar Ratio (Fe:In) | Heat Treatment Temperature (°C.) | TEM Particle Size (nm) | XRD Fe Crystallite Size (nm) |
|---|---|---|---|
| 1:1 | Fresh, as-prepared |  | 3 |
| 1:1 | 200 | 12 | 7 |
| 1:1 | 300 | 23 | 16 |
| 1:1 | 350 | 30 | 21 |
| 1:1 | 400 | 70 | 31 |
| 2:1 | Fresh, as-prepared |  | 4 |
| 2:1 | 200 | 20 | 7 |
| 2:1 | 300 | 30 | 11 |
| 2:1 | 400 | 80 | 29 |

Figure 3:
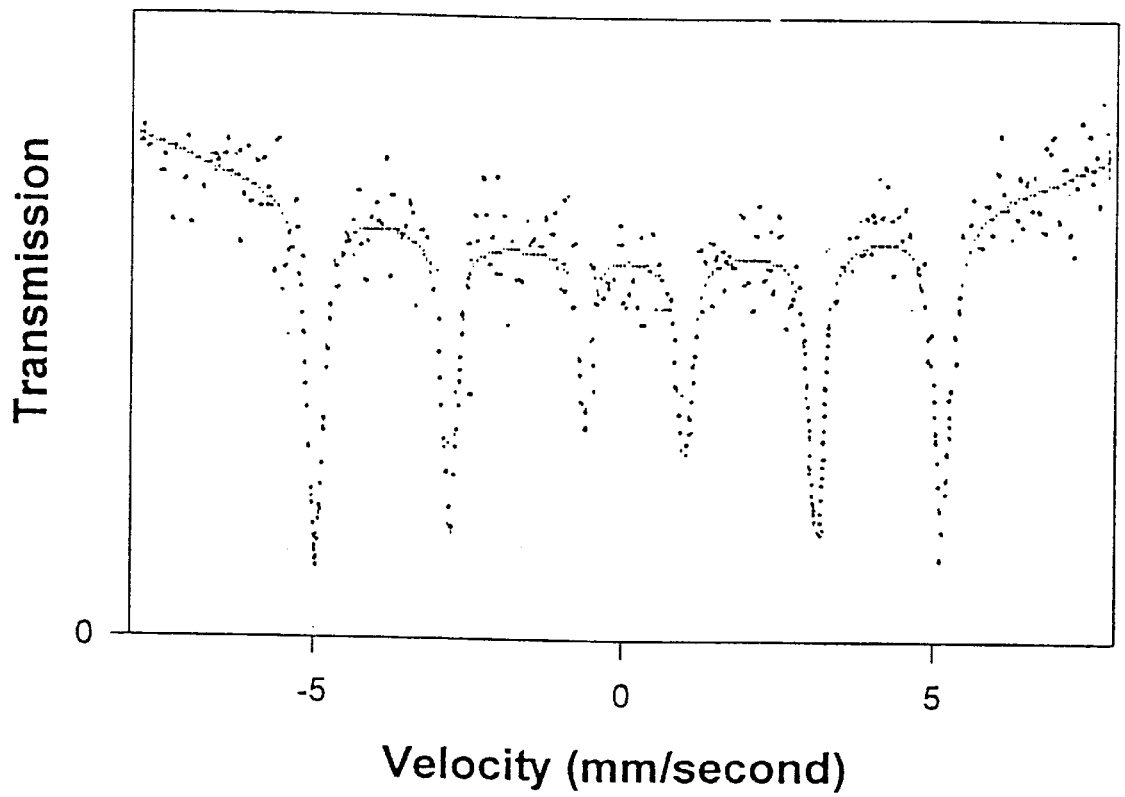
FIG. 3 is a room temperature Mossbauer spectrum of the Fe—In SMAD particles (Fe:In molar ratio=1:1) heat treated at 400° C., followed by oxidative passivation.

A room temperature Mössbauer spectrum of the Fe/In (2:1) particles is shown in FIG. 3. After the particles were heated at 400° C., the iron in the sample was much better protected and only a small amount was oxidized.

The magnetic properties of these samples were obtained on a SQUID magnetometer. In a mixture of Fe/In/$\alpha$-Fe$_2$O$_3$/

$In_2O_3$, only Fe was strongly magnetic with a saturation magnetization value of 220 emu/gram. $\alpha$-$Fe_2O_3$ was only slightly magnetic with a saturation magnetization value of 0.6 emu/gram, and neither In nor $In_2O_3$ was magnetic. SQUID can only provide the overall magnetization value of the sample therefore it was necessary to translate the SQUID data into the magnetization values of metallic iron. If the samples did not take up any oxygen during the passivation process, the chemical compositions of these samples would have been very close to those of the starting materials. For example, for the Fe:In=1:1 system, the chemical composition of the samples would have contained 33% Fe by mass and 67% In by mass. Based on XRD and Mössbauer data, about 50% by mass of the In was in the form of $In_2O_3$ after the passivation procedure. This translated into a mass balance of 30% by mass for Fe° in the Fe:In=1:1 molar ratio system. For the Fe:In=2:1 molar ratio system, the Fe° mass balance would be 46% by mass. These values were used in calculation of the saturation magnetization per gram of iron values (emu/g of Fe) as shown in Table 3.

TABLE 3

Saturation Magnetization Values (emu/g of iron) for Fe:In samples

| Fe:In Molar Ratio | Heat Treatment Temperature | Fe XRD Size (nm) | 10K | 150K | 300K |
|---|---|---|---|---|---|
| 1:1 | Fresh, as-prepared | 3 | 99 | 89 | 74 |
| 1:1 | 200° C. | 7 | 104 | 102 | 98 |
| 1:1 | 300° C. | 16 | 115 | 113 | 110 |
| 1:1 | 350° C. | 21 | 119 | 117 | 113 |
| 1:1 | 400° C. | 31 | 150 | 148 | 145 |
| 1:1 | 600° C. | 50 | 214 | 211 | 206 |
| 1:1 | 700° C. | 55 | 213 | 209 | 207 |
| 2:1 | Fresh, as-prepared | 4 | 163 | 155 | 140 |
| 2:1 | 200° C. | 7 | 152 | 148 | 145 |
| 2:1 | 300° C. | 11 | 172 | 170 | 167 |
| 2:1 | 400° C. | 29 | 192 | 189 | 187 |
| 2:1 | 600° C. | 50 | 221 | 216 | 213 |
| 2:1 | 700° C. | 60 | 219 | 215 | 212 |

Figure 4:
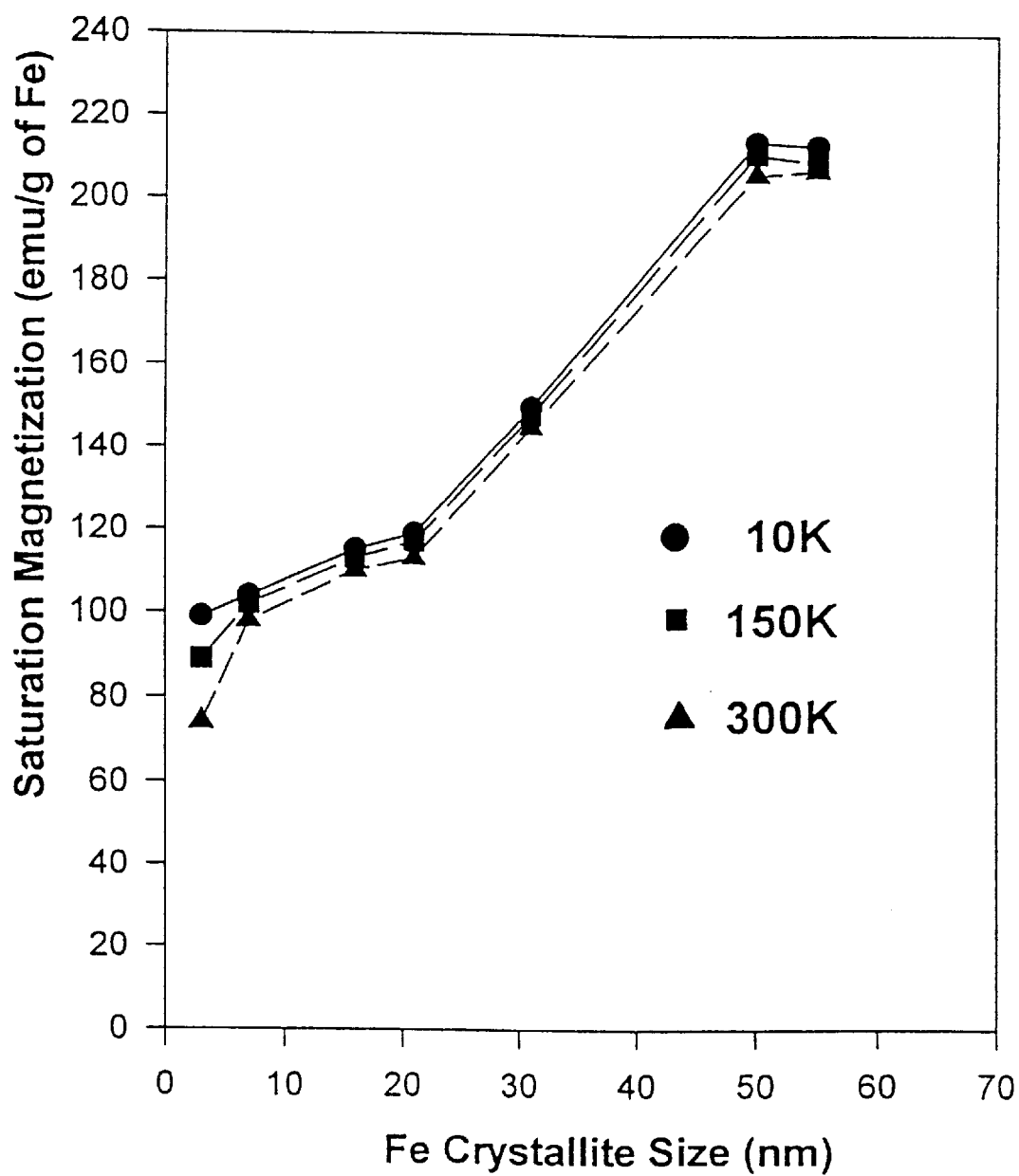
FIG. 4 is a graph illustrating saturation magnetization values of Fe—In SMAD particles (Fe:In molar ratio=1:1) versus different Fe crystallite sizes for the particles.

The coercivity values of the Fe:In samples are shown in Table 4, and FIG. 4 plots the $M_s$ values opposite Fe° crystallite sizes.

TABLE 4

Coercivity values in Oersteds of Fe:In samples

| Fe:In Molar Ratio | Heat Treatment Temperature | 10K | 77K | 150K | 220K | 300K |
|---|---|---|---|---|---|---|
| 1:1 | Fresh, as-prepared | 5 | 10 | 27 | 48 | 190 |
| 1:1 | 200° C. | 250 | 100 | 60 | 45 | 20 |
| 1:1 | 300° C. | 235 | 100 | 75 | 40 | 30 |
| 1:1 | 350° C. | 50 | 35 | 20 | 20 | 10 |
| 1:1 | 400° C. | 35 | 17 | 20 | 140 | 100 |
| 1:1 | 600° C. | 10 | 5 | 5 | 5 | 5 |
| 2:1 | Fresh, as-prepared | 300 | 175 | 107 | 75 | 45 |
| 2:1 | 200° C. | 145 | 120 | 110 | 100 | 105 |
| 2:1 | 300° C. | 150 | 113 | 105 | 105 | 105 |
| 2:1 | 400° C. | 85 | 55 | 35 | 50 | 30 |

EXAMPLE 2

In this example, the evaporation of iron and neodymium was carried out using the preferred method described above. Fe was evaporated out of an alumina-coated tungsten crucible and Nd from a boron nitride crucible placed in a tungsten basket with alumina coating on the outside in the presence of pentane at 77 K and $10^{-3}$ torr. Several reactions were carried out using a Fe:Nd 1:1 molar ratio system. In a typical reaction in which about 0.56 g of Fe (10.0 mmole) and 1.50 g of Nd (10.4 mmole) were used, 1.6 g of black pyrophoric powder was collected. Elemental analysis of the powder gave 25.1% and 69.3% by weight Fe and Nd, respectively.

The pyrophoric fresh Fe—Nd powders were then heat-treated under argon at different temperatures ranging from 250° C. to 750° C. for two hours. After the heat treatments, these powders were slowly passivated in air allowing a layer of metal oxides to form on the surfaces of these powders. No evident physical changes were observed on the stabilized powders after they had been stored in sample vials for six months.

Figure 5:
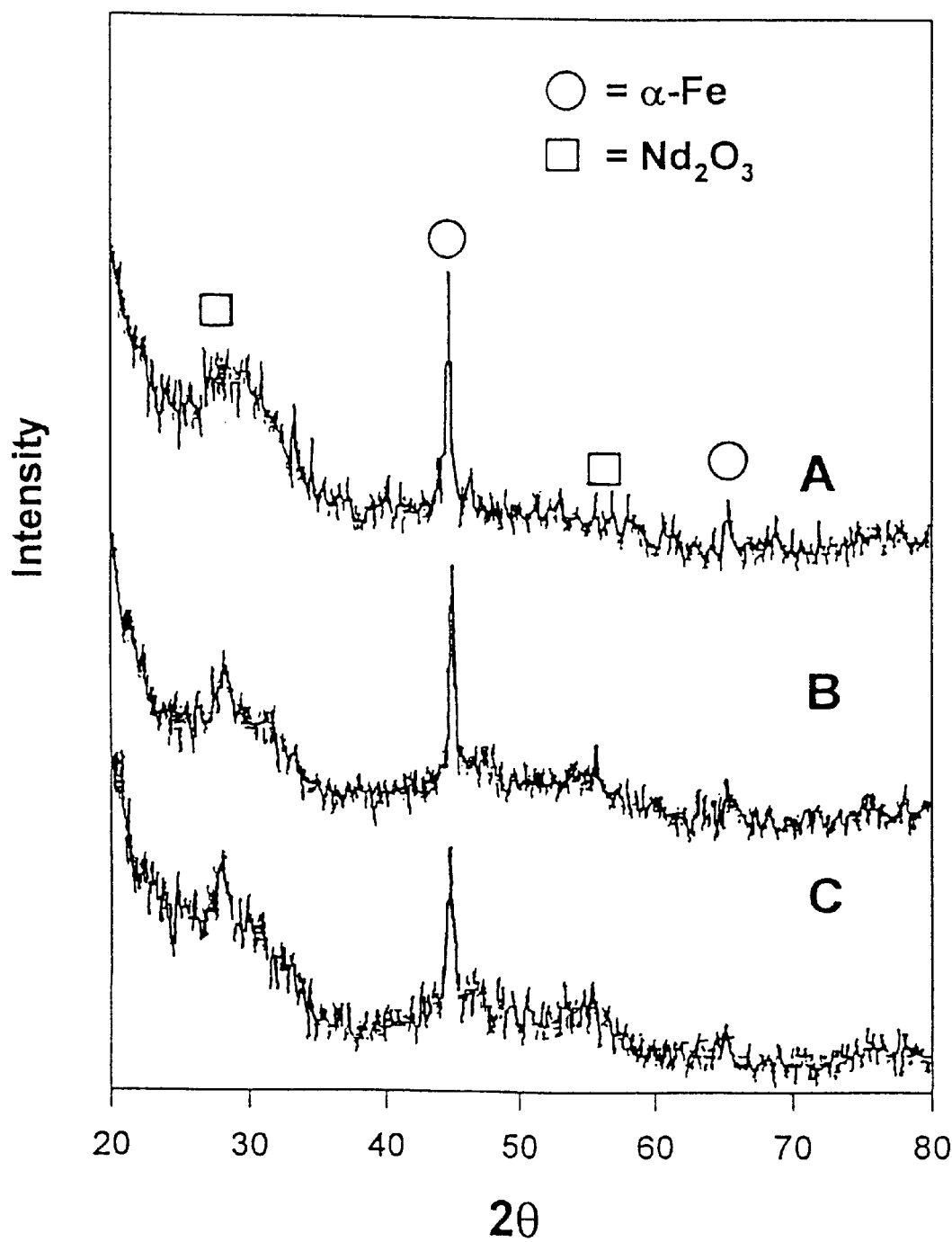
FIG. 5 is a powder X-ray diffraction pattern of heat treated and passivated Fe—Nd SMAD particles heat treated at (A) 450° C., (B) 325° C., and (C) 225° C.

A X-ray powder diffraction pattern of the fresh Fe—Nd SMAD powder showed only one broad peak due to metallic iron. The XRD patterns of heat-treated and passivated powders showed that the iron began to crystallize at very low temperature (FIG. 5), but clear signals for $Nd_2O_3$ were not observed until the heat treatment temperature reached 500° C. In addition, no clear signals for iron oxides or metallic Nd could be seen after any of the heat treatments. A weak signal for the Fe—Nd intermetallic compound $Fe_2Nd$ was observed for samples heated at 500° C. and above. The average XRD $\alpha$-Fe crystallite sizes, estimated with the Scherrer formula, are listed in Table 5 along with the BET surface area data and the estimated sample densities. The BET overall particle sizes listed in this table were estimated from the BET surface area data and the sample densities under the assumption that all the particles had a spherical shape. For comparison, the estimated TEM sizes of these particles are also listed in Table 5.

TABLE 5

XRD, TEM, and BET Surface Area Data on Fe:Nd (Molar Ratio 1:1) Samples

| Sample | TEM Size (nm) | XRD Fe Size (nm3) | BET Size (nm)[a] | BET Specific Surface Area (m²/gram) | Density (g/cm³)[b] |
|---|---|---|---|---|---|
| Fresh, as-prepared | | 2 | 93 | 8.7 | 7.4 |
| Heated at 225° C. and passivated | 12 | 8 | 32 | 28 | 6.8 |
| Heated at 325° C. and passivated | | 14 | 29 | 30 | 6.9 |
| Heated at 450° C. and passivated | | 19 | 25 | 34 | 7.1 |
| Heated at 600° C. and passivated | 30 | 26 | | | 7.2 |
| Heated at 750° C. and passivated | 35 | 29 | 25 | 34 | 7.1 | a. Assuming all the particles had a spherical shape
b. Estimation was based on the information obtained from XRD and Mössbauer studies on the concentrations of Fe, $\alpha$-$Fe_2O_3$ and $Nd_2O_3$.

To determine the valence states of Fe atoms in these samples, Mössbauer spectra were taken. When exposed to air, all the Fe atoms in the as-prepared particles were oxidized to $\alpha$-$Fe_2O_3$. The heat-treated and passivated Fe—Nd samples showed a gradual increase of the percentage of metallic Fe (as the $\alpha$-Fe sextet) upon increase of the heat treatment temperature. These changes together with the Mössbauer data on the metallic $\alpha$-Fe phase (sextet) in these powders are summarized in Table 6.

TABLE 6

Room Temperature Mössbauer Data on Fe-Nd Samples

| Sample Heat Treatment Temperature (°C.) | Isomer Shift (IS) (mm/second) | Quadruple Splitting (QS) (mm/second) | Hyperfine Field ($H_f$) (Koe) | % of Fe as α-Fe sextet |
|---|---|---|---|---|
| Fresh, as-prepared | −0.01 | 0.02 | 323.2 | |
| 225, passivated | 0.02 | 0.04 | 332.8 | 54 |
| 325, passivated | −0.01 | −0.03 | 332.7 | 59 |
| 450, passivated | 0.06 | 0.09 | 329.6 | 71 |
| 500, passivated | −0.01 | −0.01 | 332.1 | 70 |
| 600, passivated | 0.06 | 0.04 | 330.5 | 74 |
| 750, passivated | −0.02 | −0.02 | 333.41 | 68 |
| Not heated, passivated (mainly α-$Fe_2O_3$ doublets) | 0.24 | 0.96 | | 0 to 10 |

The Mössbauer data indicated the presence of pure α-Fe, while the rest of the signal was assigned to α-$Fe_2O_3$ and $Fe_2Nd$. Since the signals of α-$Fe_2O_3$ and $Fe_2Nd$. Since the signals of α-$Fe_2O_3$ and $Fe_2Nd$ (each as a doublet) overlap with each other, their relative abundance could not be assessed.

The hyperfine field of the fresh, unexposed Fe—Nd powder (324 KOe) was slightly lower than the standard value (333 KOe). This indicated a close-range electronic interaction between iron (electronegativity 1.8) and Nd (electronegativity 1.1) atoms that enabled Fe atoms to withdraw some electron density from the surrounding Nd atoms.

The Mössbauer data showed that when the samples were heat-treated at temperatures higher than 450° C., at least 70% by mass of the iron atoms were protected from further oxidation (as α-Fe) after the powders were stabilized by oxidative passivation of the surfaces. However, a Mössbauer spectrum of the sample heat-treated at 750° C. showed a slightly lower content of the α-Fe phase because more Fe atoms formed $Fe_2Nd$ at this high temperature. Also, the extensive sintering of the surface layer led to shrinking of the protecting shell resulting in the exposure of the Fe crystallite core to oxygen.

Figure 6:
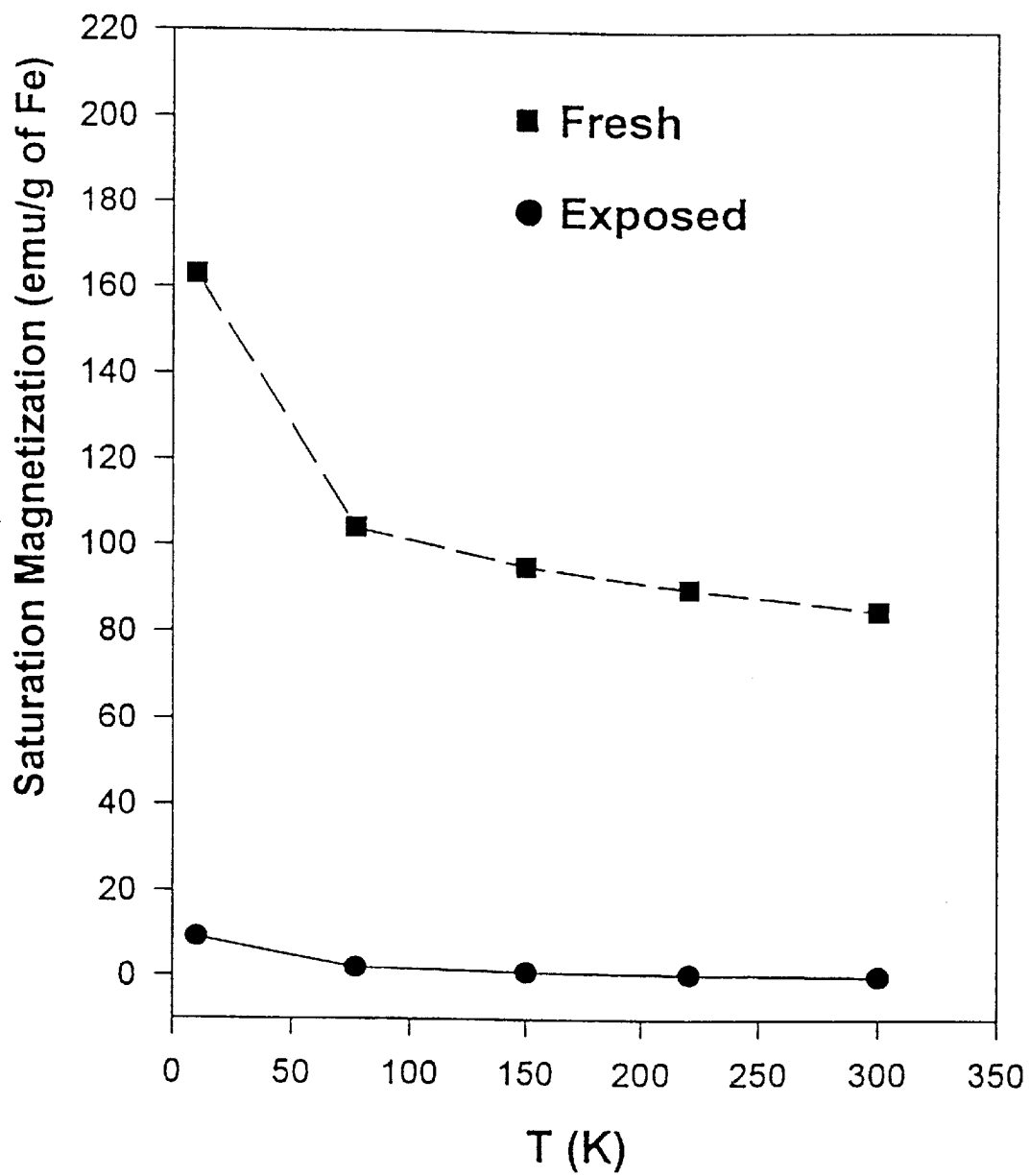
FIG. 6 is a graph of saturation magnetization values versus temperature for non-heat treated fresh and exposed Fe—Nd SMAD particles.
Figure 7:
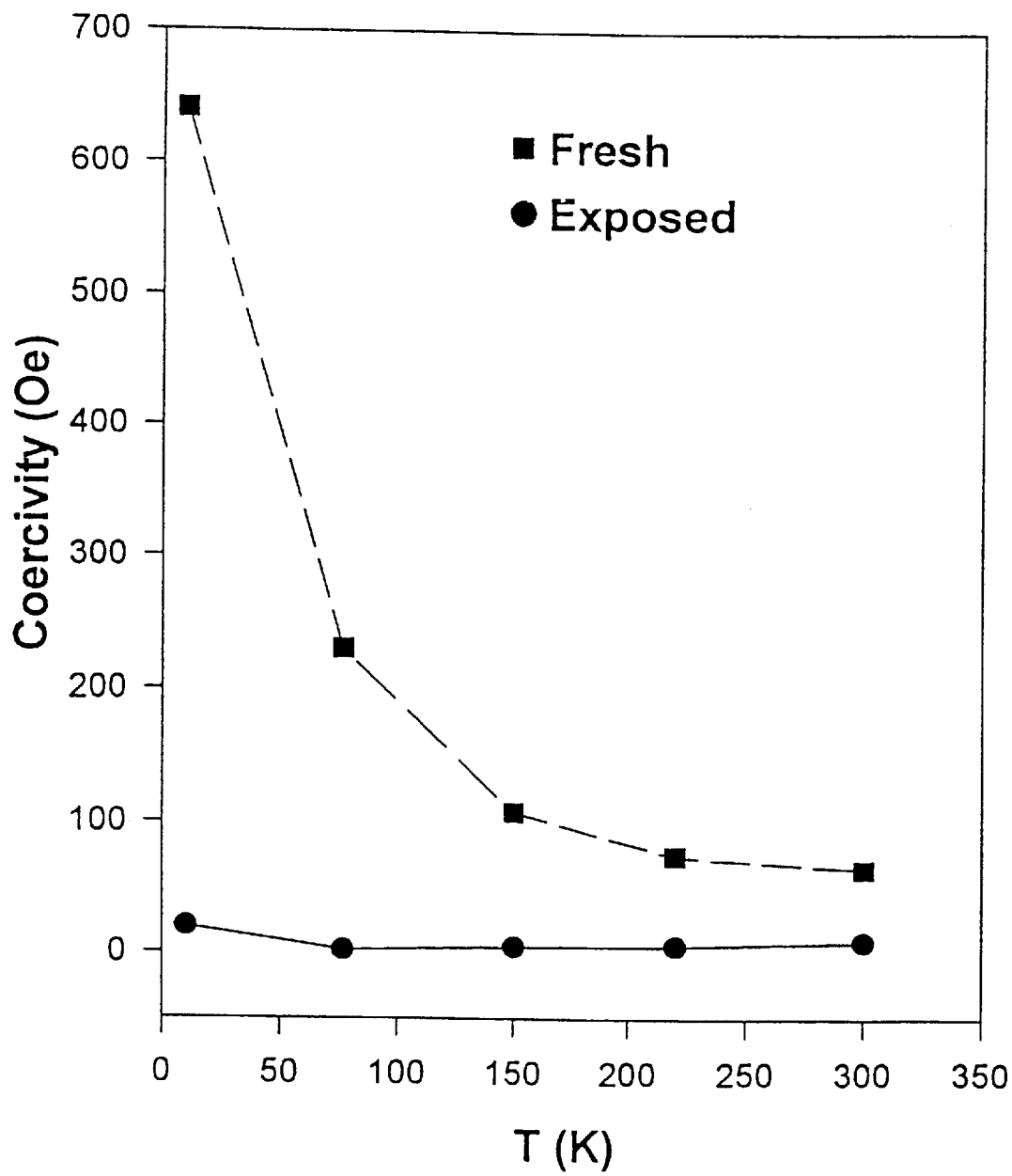
FIG. 7 is a graph of coercivity versus temperature for non-heat treated fresh and exposed Fe—Nd SMAD particles.

Magnetic studies of these Fe—Nd bimetallic particles allowed examination of the saturation magnetization and coercivity values of these powders. Based on the XRD patterns, none of the exposed samples had metallic Nd as a component. Thus, all Nd was assigned as $Nd_2O_3$ in the exposed particles, and all the Fe atoms were considered as metallic Fe when the mass balance of the passivated samples was calculated. This gave an estimated Fe mass balance of 25% for all the passivated samples with a starting Fe/Nd molar ratio of 1:1. For fresh, unexposed Fe—Nd bimetallic powders, only metallic Fe atoms and metallic Nd atoms were considered as the components, and for the Fe:Nd=1:1 molar ratio system, the theoretical mass balance for Fe was about 28%. The comparison between the saturation magnetization values of the fresh, unexposed Fe—Nd sample (not heated) and the as-prepared, exposed Fe—Nd sample (not heated) is illustrated in FIG. 6, and the comparison of their coercivities is given in FIG. 7. FIG. 6 demonstrates that the saturation magnetization value of the fresh, as-prepared Fe—Nd sample had a strong temperature dependence. The saturation magnetization value of this sample was about 162 emu/g of Fe at 10 K, and gradually decreased to about 85 emu/g of Fe at 300 K. Because there was no oxygen in this sample, the lower $M_s$ values of this sample compared with that of the bulk Fe were due to the formation of Fe—Nd alloys on the surfaces of the iron crystallites. The exposed Fe—Nd particles (not heated) had very low $M_s$ values confirming that most of the iron atoms in this sample were oxidized to α-$Fe_2O_3$ during the exposure to air as indicated by the room temperature Mössbauer data. The coercivity values of the fresh and exposed particles were also quite different. The high coercivities of the fresh, as-prepared Fe—Nd particles indicated that this sample contained ferromagnetic metallic iron clusters, whereas the very low coercivities of the exposed Fe—Nd sample were due to amorphous α-$Fe_2O_3$ (FIG. 7).

Figure 8:
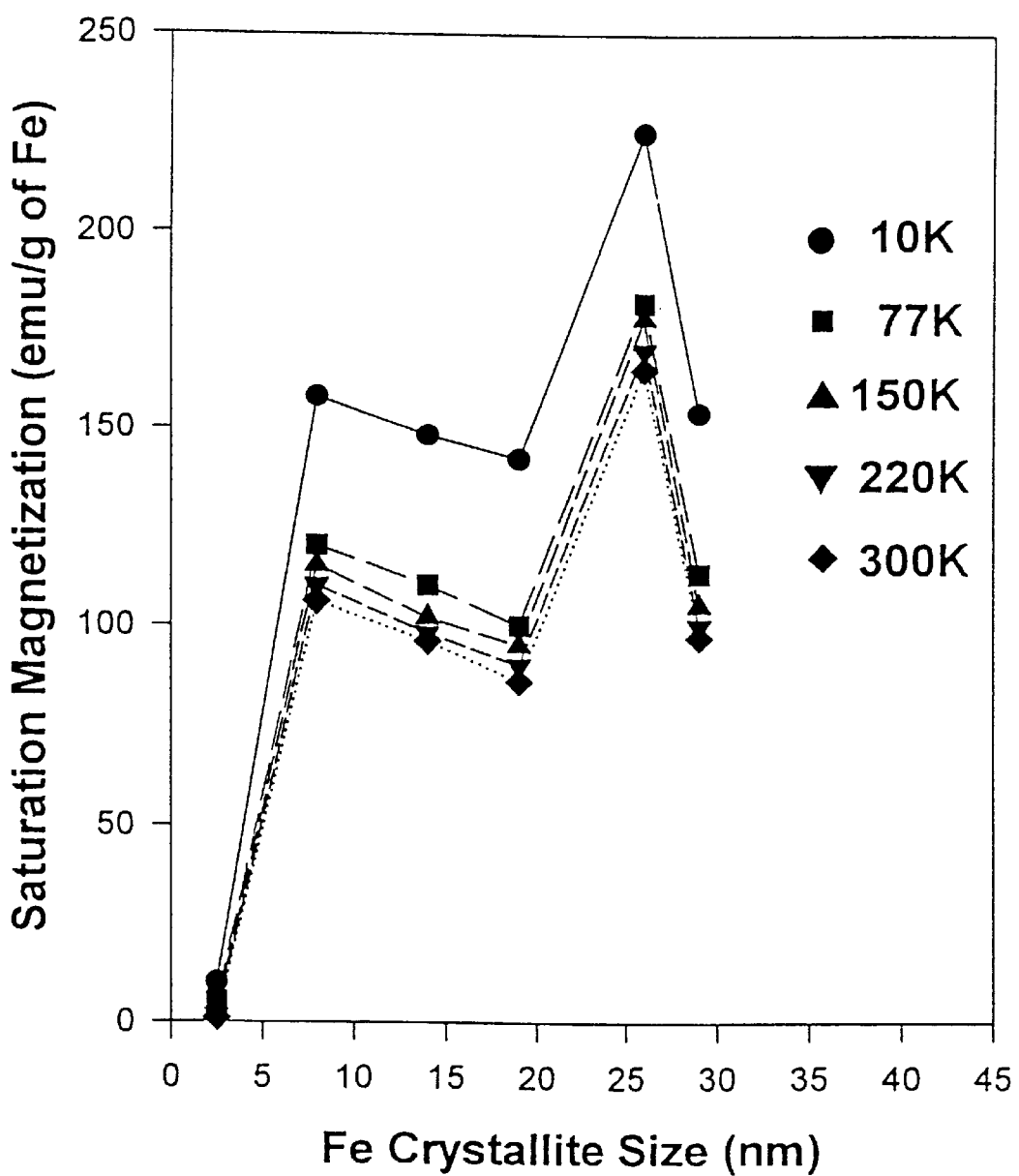
FIG. 8 is a graph of saturation magnetization versus Fe crystallite size for passivated Fe—Nd SMAD particles.

Although no information on the magnetic properties of $Nd_2O_3$ was found in the literature, it was reasonable to believe that $Nd_2O_3$ had a very low magnetic moment. Therefore, the contribution of $Nd_2O_3$ to the saturation magnetization values of the passivated Fe—Nd particles was omitted. Furthermore, α-$Fe_2O_3$ had a saturation magnetization value of 0.6 emu/g as compared to the pure Fe saturation magnetization value of 220 emu/g, thus the magnetic moment of these samples came only from metallic Fe. Based on the estimated mass balance of these samples, the magnetization values of the passivated Fe—Nd particles were calculated and are illustrated in FIG. 8 opposite the Fe crystallite sizes.

Passivated Fe—Nd particles, especially the sample not receiving heat treatment, had reduced saturation magnetization values due to oxidation upon passivation. However, the formation of Fe—Nd alloys on the surfaces of the Fe clusters was also taken into consideration. For samples heated at lower temperatures (small Fe crystallites), the oxidation effect predominates, whereas, for samples heated at higher temperatures, less Fe was oxidized and more Fe formed alloys with Nd. The low $M_s$ value of the 750° C. sample (compared with the 600° C. sample) was due to the extensive formation of $Fe_2Nd$ in this sample.

The passivated Fe—Nd particles demonstrated very low coercivities of 12.6–105 Oe at 300 K. For α-Fe crystallites with an iron oxide outside coating, room-temperature coercivity values can be as high as 1,050 Oe. These Fe—Nd powders must therefore be considered soft magnetic materials and consist of Fe° clusters protected by $Fe_2Nd$ and $Nd_2O_3$ coatings.

EXAMPLE 3

Figure 9:
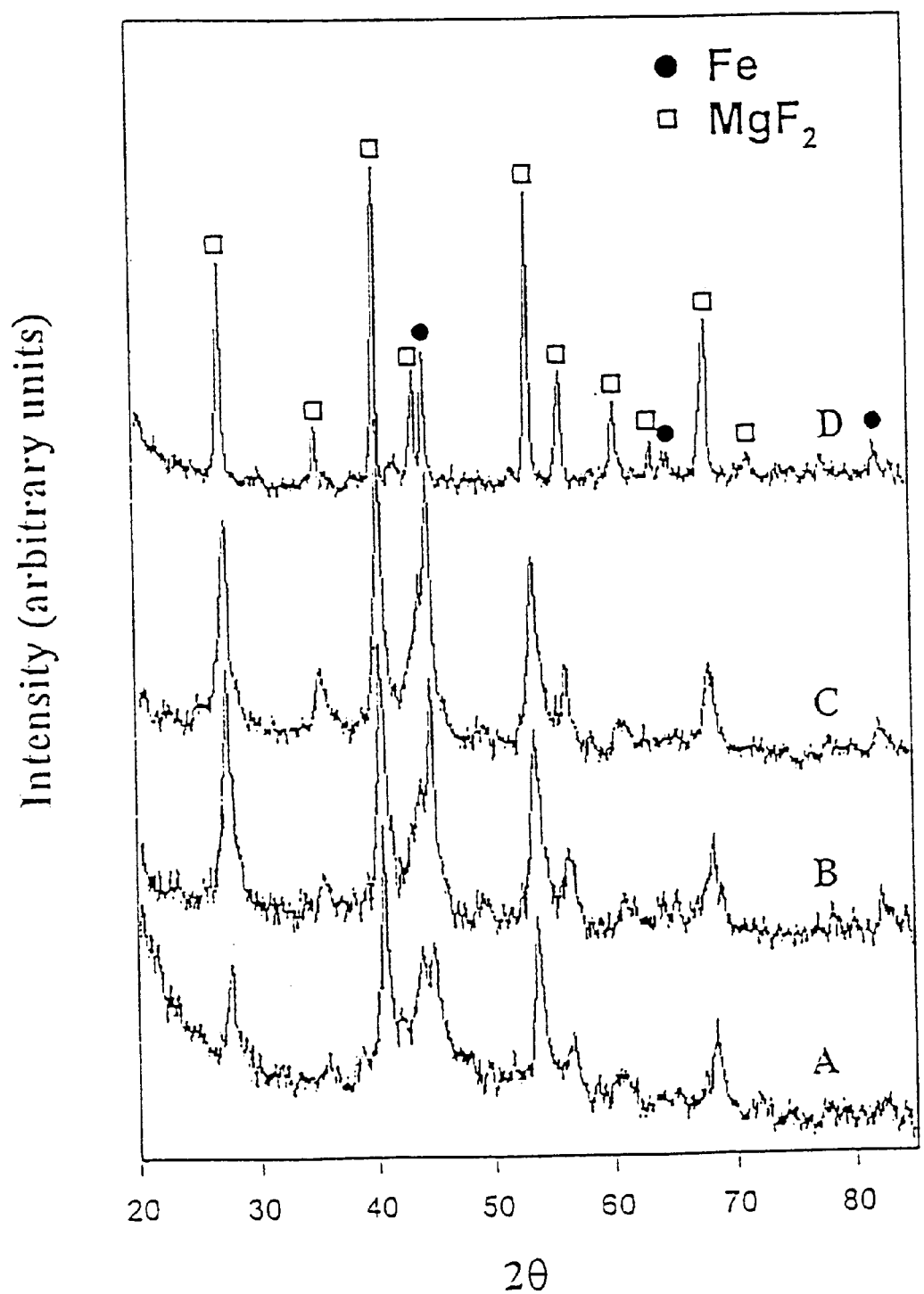
FIG. 9 is a powder X-ray diffraction pattern of fresh and passivated Fe—Mg $F_2$ SMAD particles (Fe:Mg $F_2$ molar ratio=1:2) wherein the particles are (A) fresh, as prepared, (B) heat treated at 200° C. and passivated, (C) heat treated at 400° C. and passivated and (D) heat treated at 600° C. and passivated.
Figure 10:
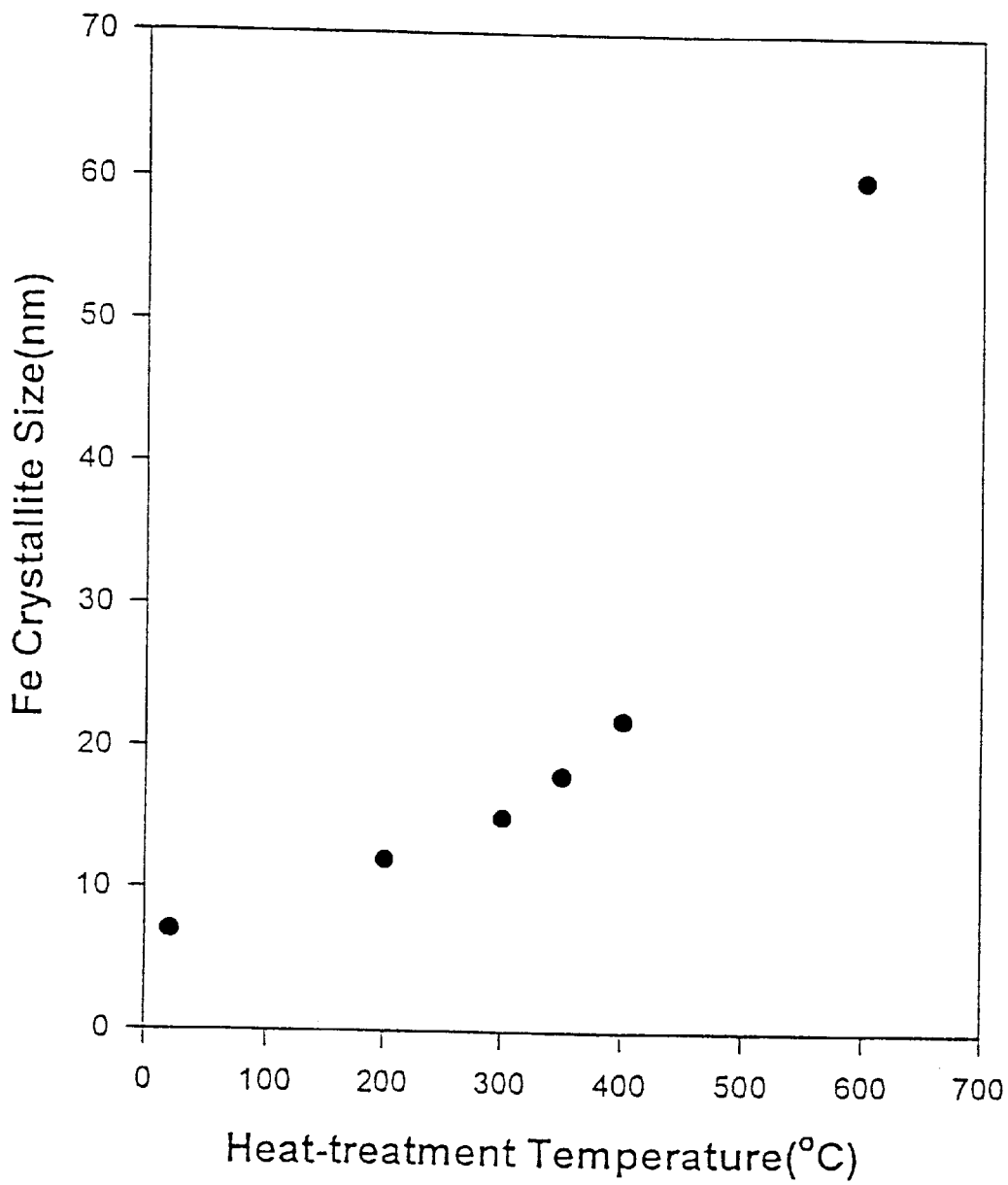
FIG. 10 is a powder X-ray diffraction pattern of different Fe crystallite sizes in Fe—Mg $F_2$ SMAD particles heat treated at different particles.

The Fe—$MgF_2$ system studied in this example using the preferred method described above had a Fe to $MgF_2$ molar ratio of 1:2 where 0.80 g of Fe (14.3 mmole) and 1.78 g $MgF_2$ (28.6 mmole) were co-evaporated and deposited at 77 K with pentane vapor. The evaporation temperature of $MgF_2$ under the normal SMAD reactor pressure (about $10^{-3}$ torr) was 1100° C. About 2 g of the product was collected. FIG. 9 gives the XRD patterns of the as-prepared samples as well as the heat-treated and passivated Fe—$MgF_2$ (molar ratio 1:2) powders. In the as-prepared sample, signals of $MgF_2$ and Fe were both present, and the estimated Fe crystallite size was about 9 nm. The XRD patterns of the heat-treated and passivated samples showed only the signals of Fe and $MgF_2$, and no signals for iron oxides were visible. The estimated XRD sizes of the Fe crystallites for each of the heat-treatment temperatures are given in Table 7. A graphic version of the information provided in this table is given in FIG. 10.

TABLE 7

XRD Fe Sizes of Fe-MgF$_2$ Particles

| Heat Treatment Temperature (°C.) | XRD Fe Crystallite Size (nm) |
|---|---|
| Room Temperature, as-prepared | 9.0 |
| 200 | 12.0 |
| 300 | 15.0 |
| 350 | 18.0 |
| 400 | 22.0 |
| 600 | 60.0 |

Figure 11:
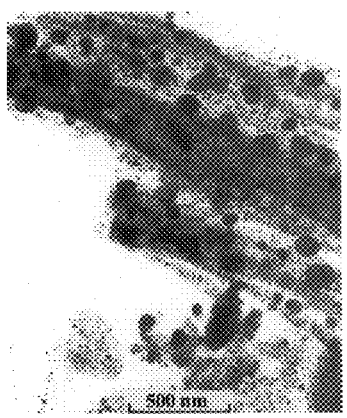
FIG. 11 is a TEM photo of Fe—Mg $F_2$ SMAD particles heat treated at 500° C. for 2 hrs.

TEM photos of these particles are shown in FIG. 11. The TEM measured sizes of the particles and the α-Fe crystallite sizes are listed in Table 8.

TABLE 8

TEM Sizes Fe-MgF$_2$ Particles

| Heat Treatment Temperature (°C.) | TEM Overall Particle Size (nm) | TEM α-Fe Crystallite (I)$^a$ Size (nm) | TEM α-Fe Crystallite (II)$^b$ Size (nm) |
|---|---|---|---|
| Room Temperature, as-prepared | | | |
| 200 | 12–15 | | |
| 300 | 17–19 | | |
| 400 | 22–25 | | |
| 500 | | 50–100 | 10–15 |
| 600 | | 50–150 | 10–15 | a. Large Fe Crystallites
b. Isolated Small Fe Crystallites

The TEM photos show that, after being heated at lower temperatures, the Fe—MgF$_2$ particles still had a near single-phase structure with the Fe crystallites embedded in a matrix of MgF$_2$ demonstrating that the Fe crystallites grew very little. When the temperature reached 500° C., severe phase separation occurred. Most of the Fe clusters aggregated into very large Fe particles (50 to 100 nm), and only a small number of the smaller Fe crystallites remained. In the 500° C. and 600° C. samples, there were actually two groups of Fe crystallites. One group included the large Fe particles with a size range of around 100 nm, and the other group contained the smaller 10–15 nm Fe crystallites. The large Fe particles accounted for more than 90% of the total mass of the Fe in these materials whereas the small Fe crystallites represented less than 10% of the total Fe mass. After heat-treatments at the temperatures of 500° C. and 600° C., the MgF$_2$ crystals also grew into large pieces with a size range of a few hundred nanometers.

Figure 12:
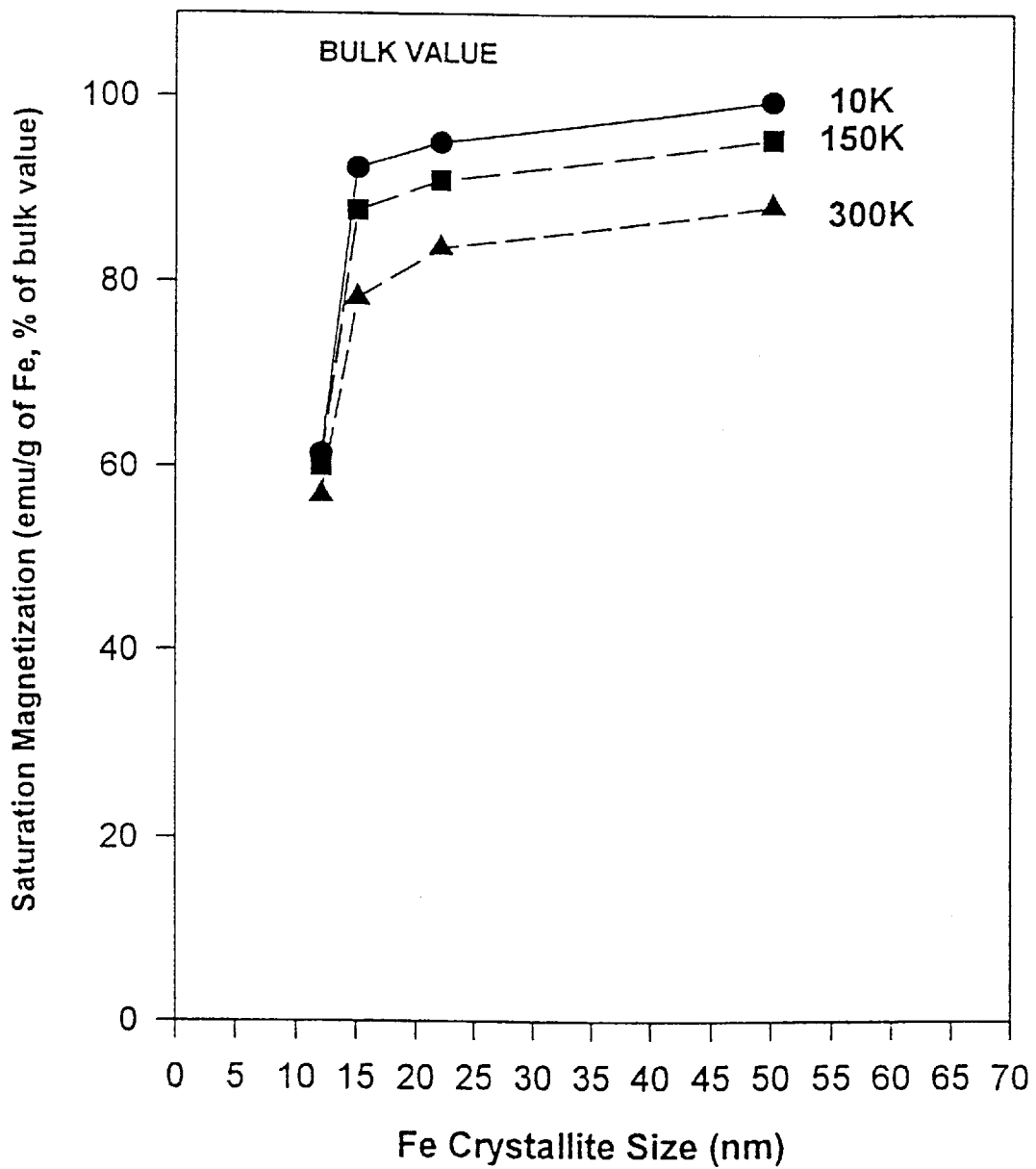
FIG. 12 is a graph of saturation magnetization values versus Fe crystallite size for passivated Fe—Mg $F_2$ SMAD particles (percentage of Fe bulk value, 220 emu/g of Fe)

The magnetic properties of these Fe—MgF$_2$ particles were studied using a SQUID magnetometer. Although a small portion of the Fe atoms in these materials were actually oxidized during the passivation process, the magnetization values per gram of Fe were calculated without consideration of the mass change caused by the oxidation of Fe atoms because the extent of the oxidation was very hard to estimate, and also because the oxidation of Fe caused only a small change in the mass balance of these materials. The calculated magnetization values of these Fe—MgF$_2$ materials are listed in Table 9, and the coercivity values are given in Table 10. FIG. 12 gives the percentage of the bulk magnetization value (220 emu/g of Fe) at 300 K versus Fe crystallite sizes in these particles.

TABLE 9

Magnetization Values of Passivated Fe-MgF$_2$ Particles

| Heat Treatment Temp (°C.) | α-Fe Size (nm) | Magnetization (emu/g of Fe) at Different Temperatures (K) | | | | |
|---|---|---|---|---|---|---|
| | | 10K | 77K | 150K | 220K | 300K |
| Fresh, as-prepared | 9 | 187 | 183 | 177 | 170 | 158 |
| 200 | 12 | 135 | 134 | 132 | 129 | 125 |
| 300 | 15 | 203 | 198 | 193 | 185 | 172 |
| 400 | 22 | 209 | 205 | 200 | 193 | 184 |
| 600 | 50–100 | 219 | 215 | 210 | 205 | 194 |

TABLE 10

Magnetic Coercivity Values of Fe-MgF$_2$ Particles

| Heat Treatment Temp (°C.) | α-Fe Size (nm) | Magnetic Coercivity (Oe) at Different Temperatures (K) | | | | |
|---|---|---|---|---|---|---|
| | | 10K | 77K | 150K | 220K | 300K |
| Fresh, as-prepared | 9 | 420 | 270 | 215 | 170 | 105 |
| 200 | 12 | 955 | 475 | 240 | 179 | 159 |
| 300 | 15 | 320 | 120 | 120 | 95 | 72 |
| 400 | 22 | 580 | 370 | 265 | 200 | 130 |
| 600 | 50–100 | 180 | 140 | 90 | 72 | 56 |

Figure 13:
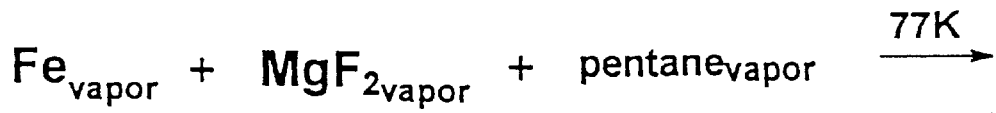
FIG. 13 is a schematic representation illustrating the encapsulation of Fe core metal within Mg $F_2$ shell material.
Figure 13:
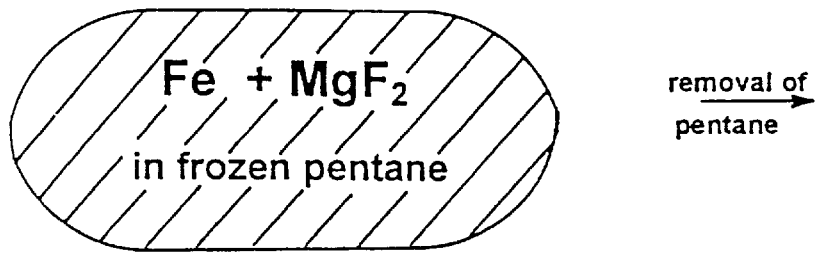
Figure 13:
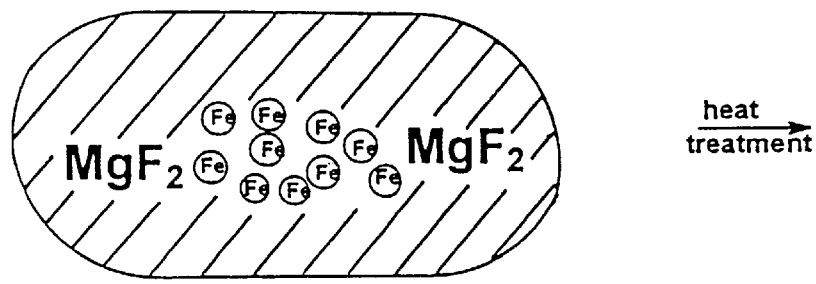
Figure 13:
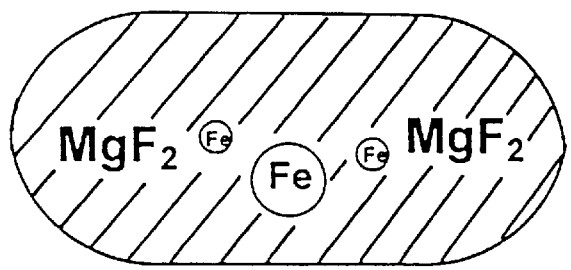

The magnetization data in Table 9 and the information provided in FIG. 12 show that after being heated at temperatures of 400° C. and above, more than 85% of the Fe atoms were protected when these particles were exposed to air. A schematic illustration for the formation of encapsulated Fe clusters in a MgF$_2$ matrix using the SMAD method is shown in FIG. 13.

EXAMPLE 4

Figure 15:
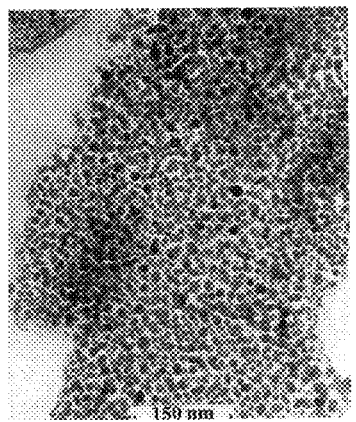
FIG. 15 is a TEM photo of Co—Mg $F_2$ SMAD particles heat treated at 400° C. for 2 hrs.
Figure 16:
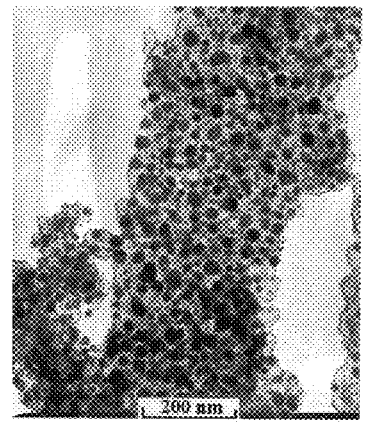
FIG. 16 is a TEM photo of Co—Mg $F_2$ SMAD particles heat treated at 600° C. for 2 hrs.
Figure 14:
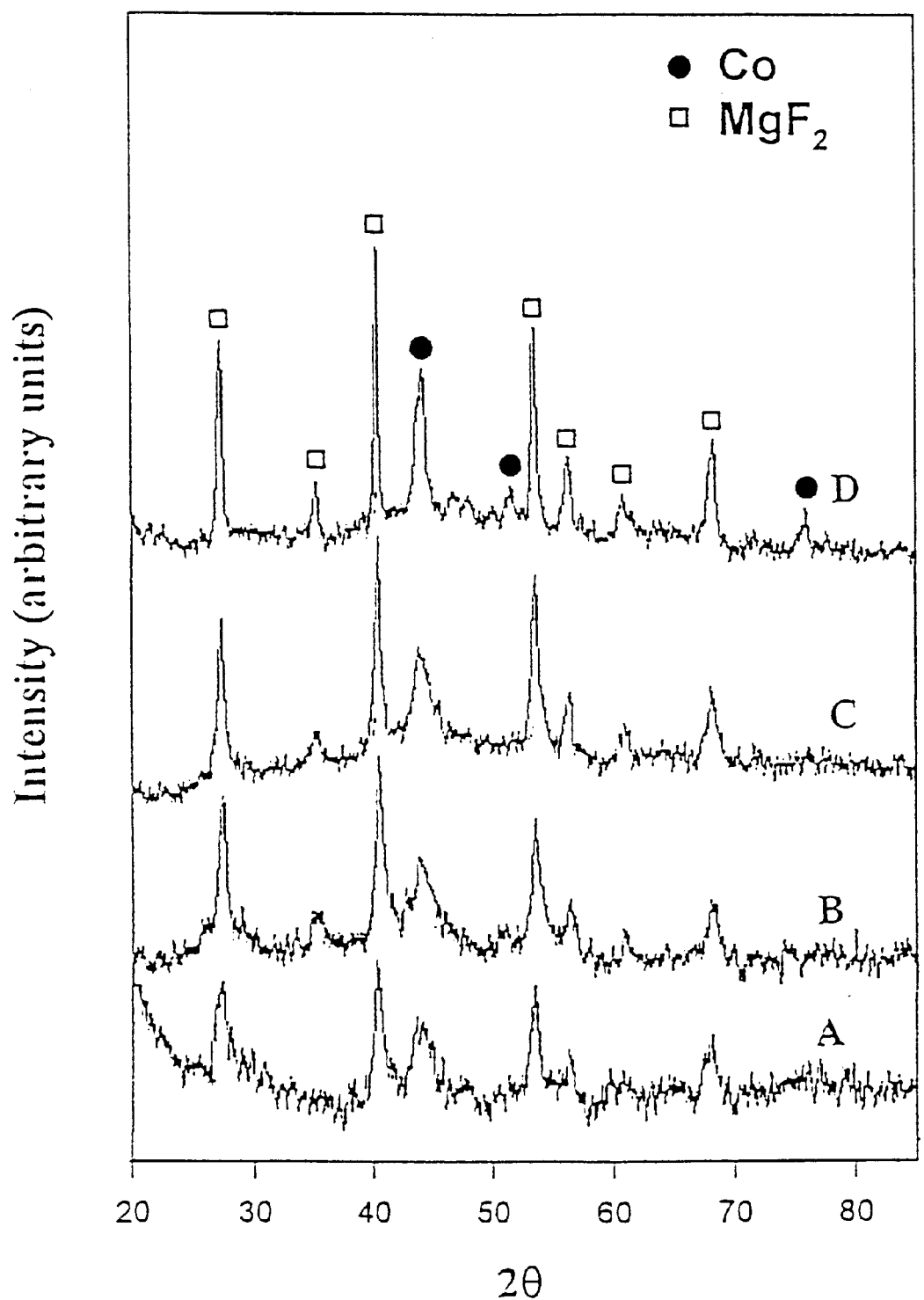
FIG. 14 is a powder X-ray diffraction pattern of fresh and passivated CO—Mg $F_2$ SMAD particles: (A) fresh, as prepared; (B) heat treated at 200° C. and passivated; (C) heat treated at 400° C. and passivated; and (D) heat treated at 700° C. and passivated.

In this example, the evaporation of Co and MgF$_2$ followed the preferred method as described above. The Co—MgF$_2$ system had a molar ratio of 1:2 in which 0.80 g of cobalt (13.6 mmole) and 1.69 g of MgF$_2$ (27.2 mmole) were co-evaporated in the presence of pentane at 77 K. Co vaporized at about 1300° C. under the SMAD reactor pressure ($10^{-3}$ torr). FIG. 14 gives the XRD patterns of the fresh, as-prepared Co—MgF$_2$ powders as well as the heat-treated and passivated samples. The average size of the Co crystallites of the fresh, as-prepared sample was estimated at about 4.5 nm by using the Scherrer formula for XRD broadening. All the XRD patterns showed metallic cobalt and MgF$_2$, and no clear signals of cobalt oxides could be observed. The estimated XRD asizes and the estimated TEM sizes of cobalt crystallites in these samples are listed in Table 11. TEM photos of these particles are given in FIGS. 15 and 16.

TABLE 11

Estimated Co Crystallite Sizes in the Co-MgF$_2$ Particles

| Heat Treatment Temperature (°C.) | XRD Co Crystallite Size (nm) | TEM Co Particle Size (nm) |
|---|---|---|
| Fresh, as-prepared | 4.5 | |
| 200 | 5.9 | |
| 300 | 7.2 | 5–10 |
| 400 | 10.0 | 10–15 |
| 500 | 12.2 | 15–20 |

TABLE 11-continued

Estimated Co Crystallite Sizes in the Co-MgF$_2$ Particles

| Heat Treatment Temperature (°C.) | XRD Co Crystallite Size (nm) | TEM Co Particle Size (nm) |
|---|---|---|
| 600 | 13.6 | 15–25 |
| 700 | 16.0 | 20–30 |

Figure 17:
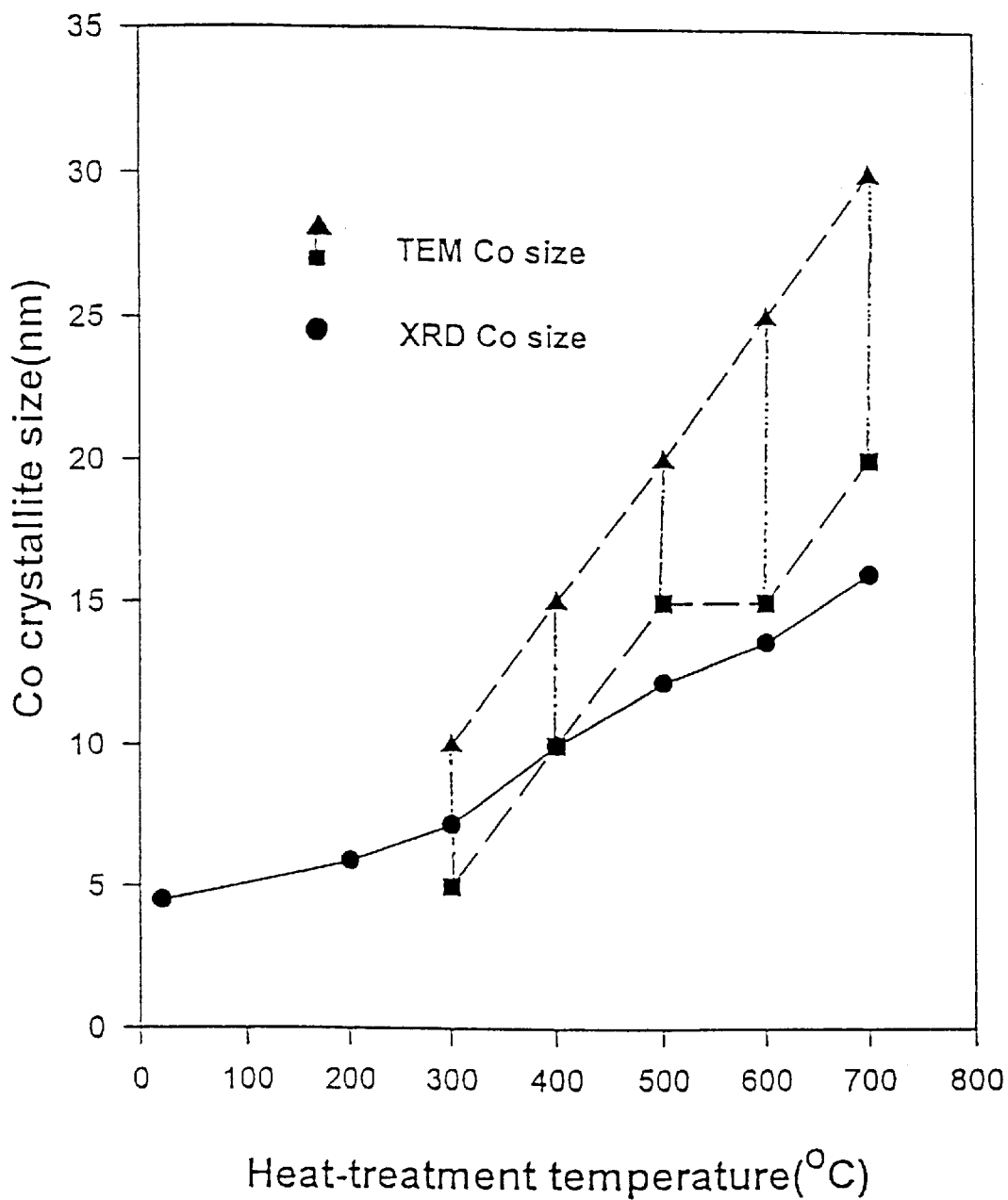
FIG. 17 is a graph of Co crystallite size versus heat treatment temperature for Co—Mg $F_2$ SMAD particles heat treated at different temperatures.

A graphic version of the heat-treatment temperature-Co crystallite size relationship is given in FIG. 17. From a comparison of Table 11 and FIG. 18, it will be appreciated that the XRD Co sizes were generally smaller than the sizes estimated from the TEM photos because, in the XRD patterns of the Co—MgF$_2$ particles, the Co line (2θ=44.2°) by which the Co crystallite sizes were calculated with the Scherrer formula, partially overlaps with a MgF$_2$ line which is at about 39.8° of 2θ. As a result, the calculated XRD Co sizes were smaller than they should have been, thus the TEM sizes were more accurate. The magnetic properties of these Co—MgF$_2$ particles are listed in Tables 12 and 13 and also shown in FIGS. 18 and 19.

TABLE 12

Saturation Magnetization Values of Co-MgF$_2$ Particles

| Heat Treatment Temperature (°C.) | XRD Co Size (nm) | TEM Co Size (nm) | Saturation Magnetization Values (emu/g of Co) at Different Temperatures (K) | | | | |
|---|---|---|---|---|---|---|---|
| | | | 10K | 77K | 150K | 220K | 300K |
| Fresh, as-prepared | 4.5 | | 113 | 111 | 109 | 107 | 106 |
| 200 | 5.9 | | 102 | 101 | 100 | 99 | 98 |
| 300 | 7.2 | 5–10 | 105 | 104 | 103 | 101 | 100 |
| 400 | 10.0 | 10–15 | 107 | 104 | 103 | 101 | 100 |
| 500 | 12.2 | 15–20 | 120 | 118 | 117 | 116 | 115 |
| 600 | 13.6 | 15–25 | 131 | 129 | 129 | 128 | 128 |
| 700 | 16.0 | 20–30 | 134 | 132 | 131 | 131 | 130 |

TABLE 13

Magnetic Coercivity Values of Co-MgF$_2$ Particles

| Heat Treatment Temperature (°C.) | XRD Co Size (nm) | TEM Co Size (nm) | Coercivity Values (Oe) at Different Temperatures (K) | | |
|---|---|---|---|---|---|
| | | | 10K | 150K | 300K |
| Fresh, as-prepared | 4.5 | | 500 | 239 | 71 |
| 200 | 5.9 | | 267 | 84 | 35 |
| 300 | 7.2 | 5–10 | 515 | 82 | 74 |
| 400 | 10.0 | 10–15 | 585 | 118 | 78 |
| 500 | 12.2 | 15–20 | 466 | 174 | 92 |
| 600 | 13.6 | 15–25 | 420 | 210 | 140 |
| 700 | 16.0 | 20–30 | 509 | 206 | 177 |

Figure 18:
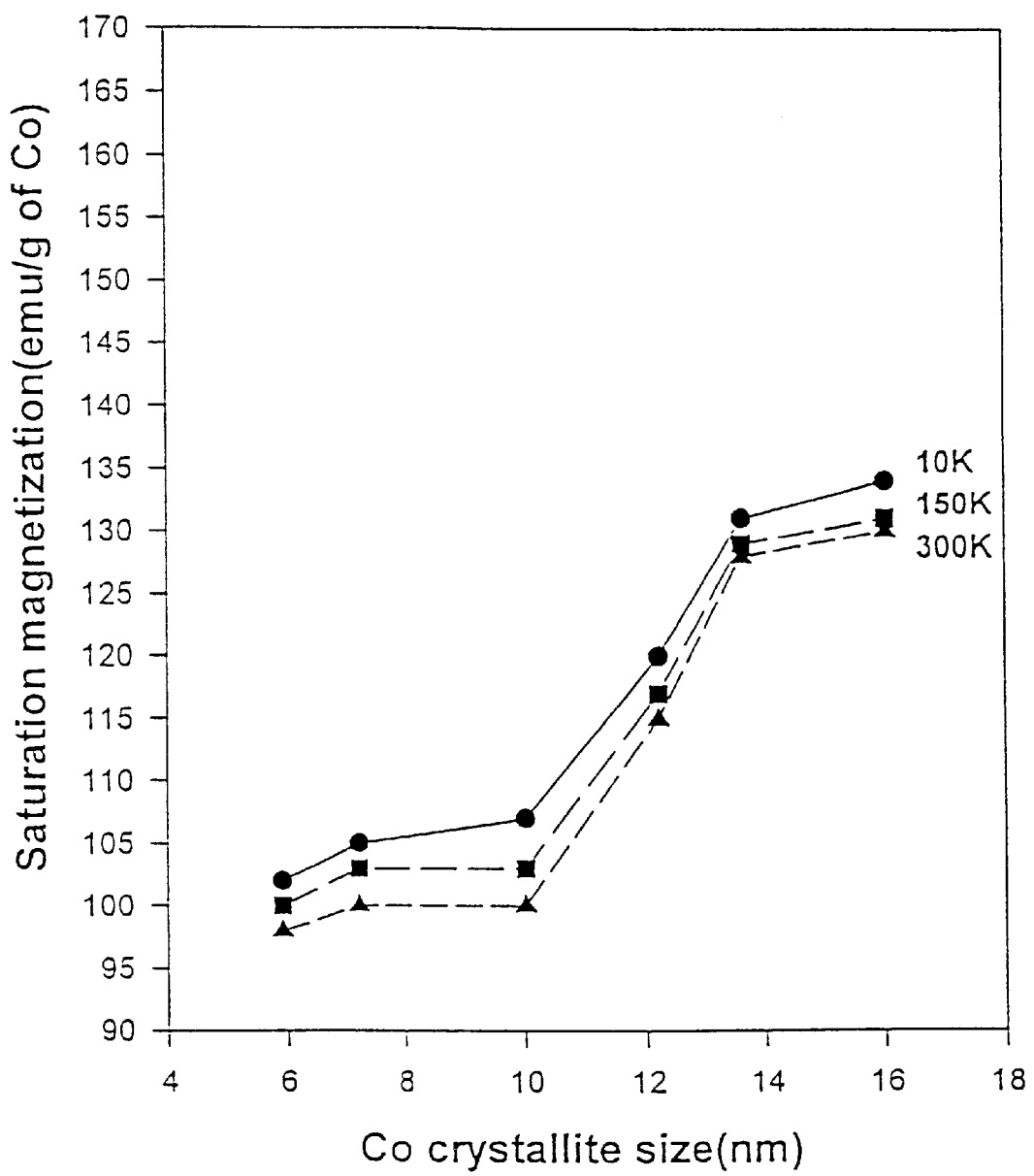
FIG. 18 is a graph of saturation magnetization values versus Co crystallize size for passivated Co—Mg $F_2$ SMAD particles.
Figure 19:
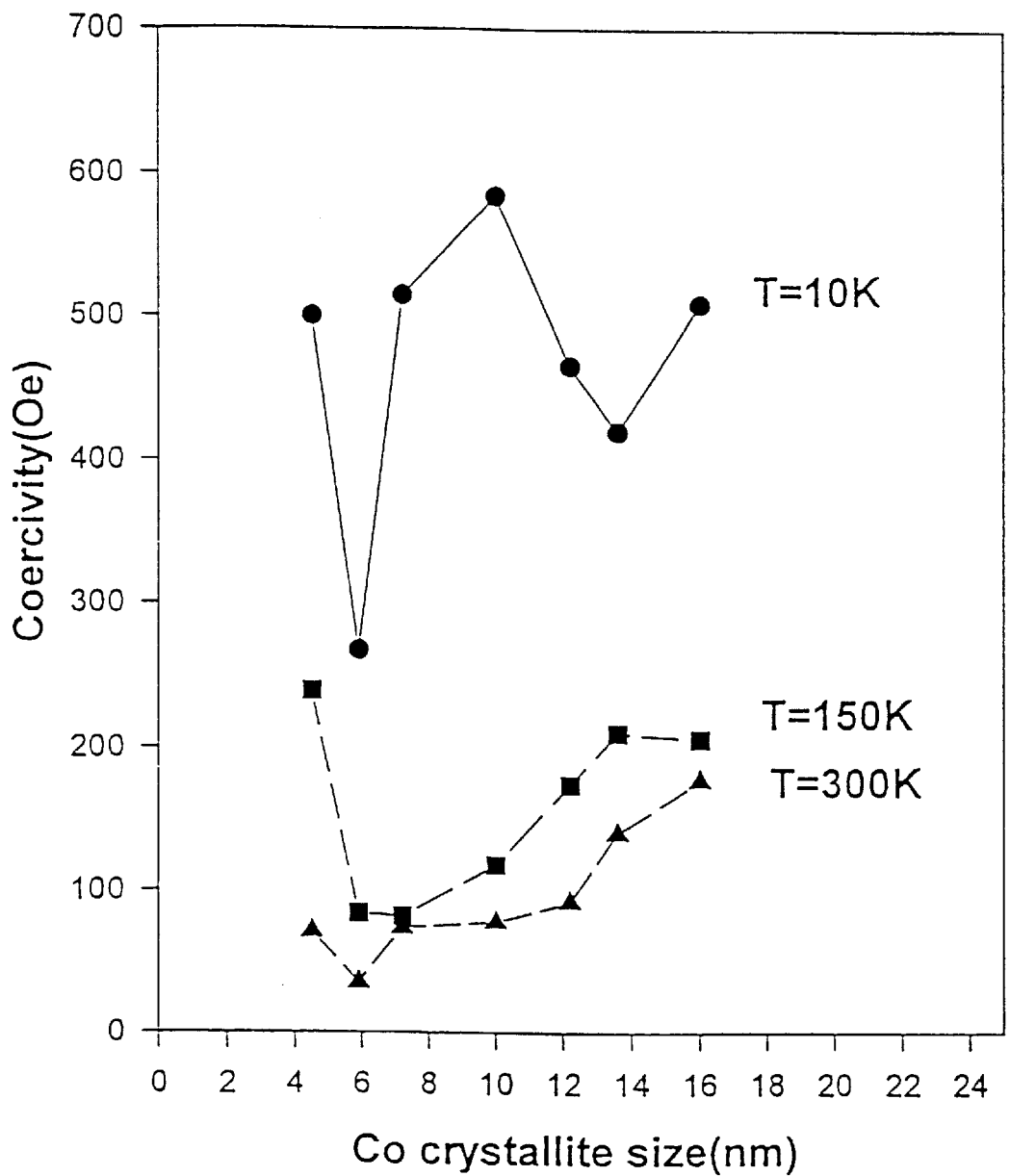
FIG. 19 is a graph of magnetic coercivity versus Co crystallite size for passivated Co—Mg $F_2$ SMAD particles.
Figure 20:
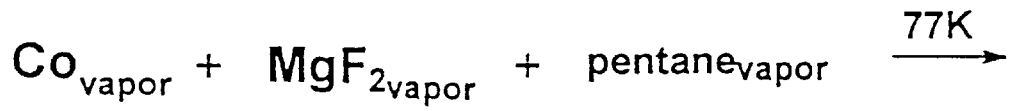
FIG. 20 is a schematic representation illustrating the encapsulation of Co core metal within Mg $F_2$ shell material.
Figure 20:
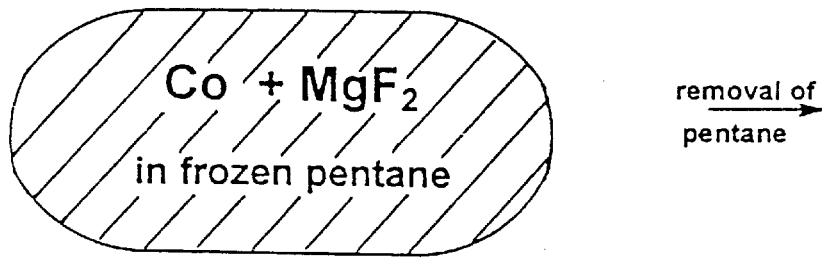
Figure 20:
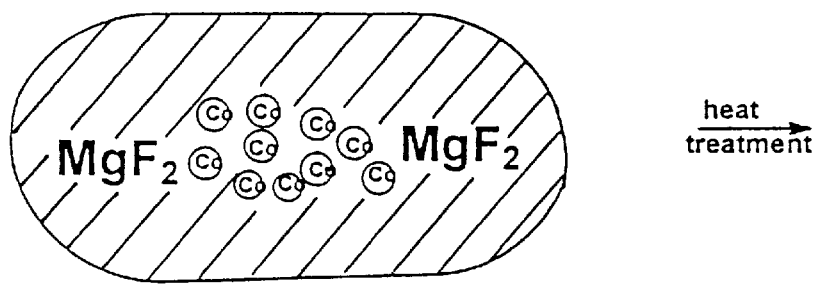
Figure 20:
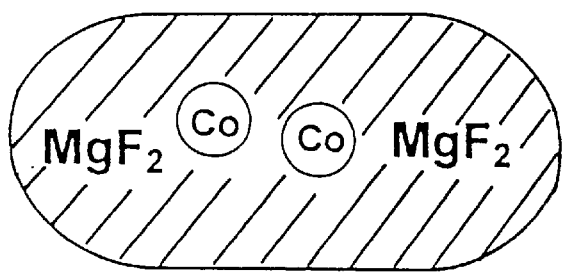

Cobalt had a bulk magnetization value of 162.5 emu/g of Co and, thus, at least 80% of the cobalt atoms were protected so long as these particles were heated at temperatures higher than 500° C. before they were exposed to air as illustrated in Table 12 and FIG. 18. The Co—MgF$_2$ system had a much narrower Co size distribution, therefore, a simplified schematic illustration of the encapsulation of Co particles in the MgF$_2$ matrix is given in FIG. 20.

EXAMPLE 5

Figure 21:
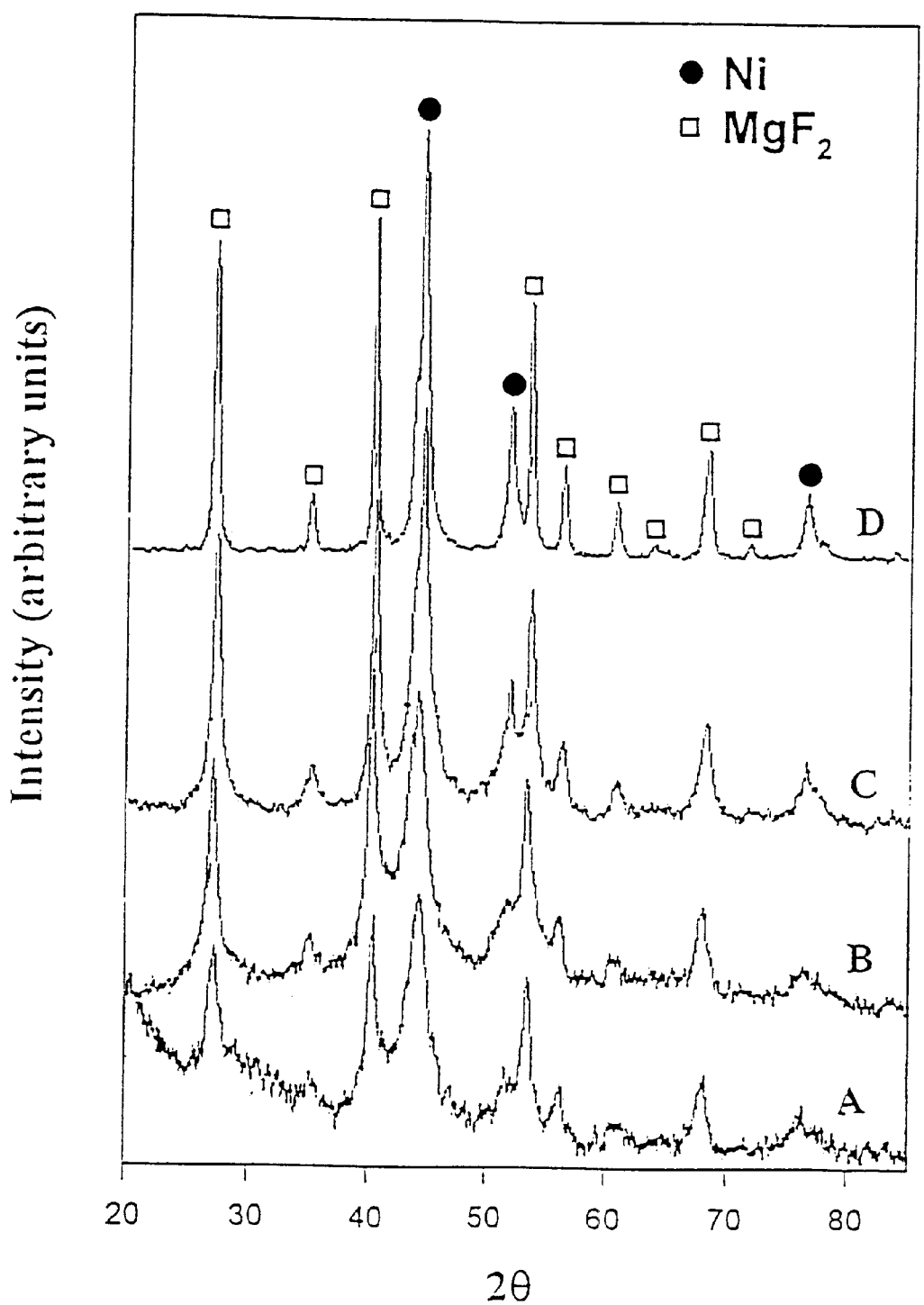
FIG. 21 is a powder X-ray diffraction pattern of fresh and passivated Ni—Mg $F_2$ SMAD particles: (A) fresh, as prepared; (B) (B) heat treated at 200° C. and passivated; (C) heat treated at 400° C. and passivated; and (D) heat treated at 700° C. and passivated.

The evaporation of Ni and MgF$_2$ also followed the preferred method as described above. Ni vaporized at about 1400° C. under the SMAD reactor pressure of about $10^{-3}$ torr. The Ni—MgF$_2$ system had a molar ratio of 1:2 in which 0.80 g of Ni (13.6 mmole) and 1.69 g of MgF$_2$ (27.2 mmole) were co-evaporated in the presence of pentane at 77 K. FIG. 21 gives the XRD patterns of the fresh, as-prepared and the heat-treated and passivated Ni—MgF$_2$ particles. The average size of the Ni crystallites was estimated at 5.8 nm in the fresh, as-prepared sample. In all the XRD patterns of the heat-treated and passivated samples, only the signals of Ni and MgF$_2$ were clearly visible. No signs of nickel oxides were detected. The estimated XRD sizes and TEM sizes of the Ni crystallites are listed in Table 14.

TABLE 14

XRD and TEM Sizes of Ni Crystallites in Ni-MgF$_2$ Particles

| Heat Treatment Temperature (°C.) | XRD Ni Crystallite Size (nm) | TEM Ni Crystallite Size (nm) |
|---|---|---|
| Fresh, as-prepared | 5.8 | |
| 200 | 7.5 | 7 |
| 300 | 8.5 | 5–10 |
| 400 | 11.0 | 10 |
| 500 | 13.6 | 10–15 |
| 600 | 19.0 | 15–25 |

Figure 22:
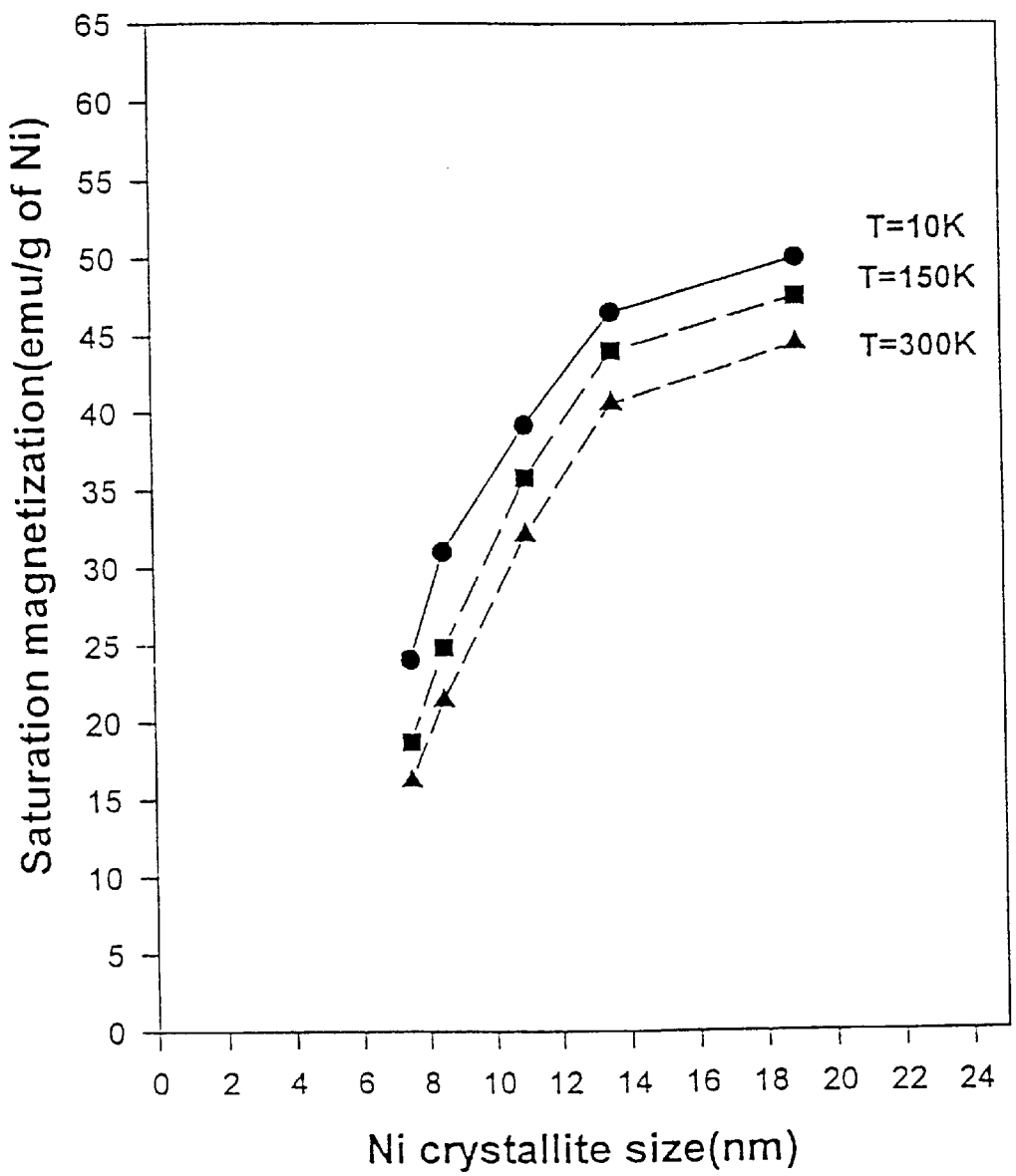
FIG. 22 is a graph of saturation magnetization values versus Ni crystallize size for passivated Ni—Mg $F_2$ SMAD particles.
Figure 23:
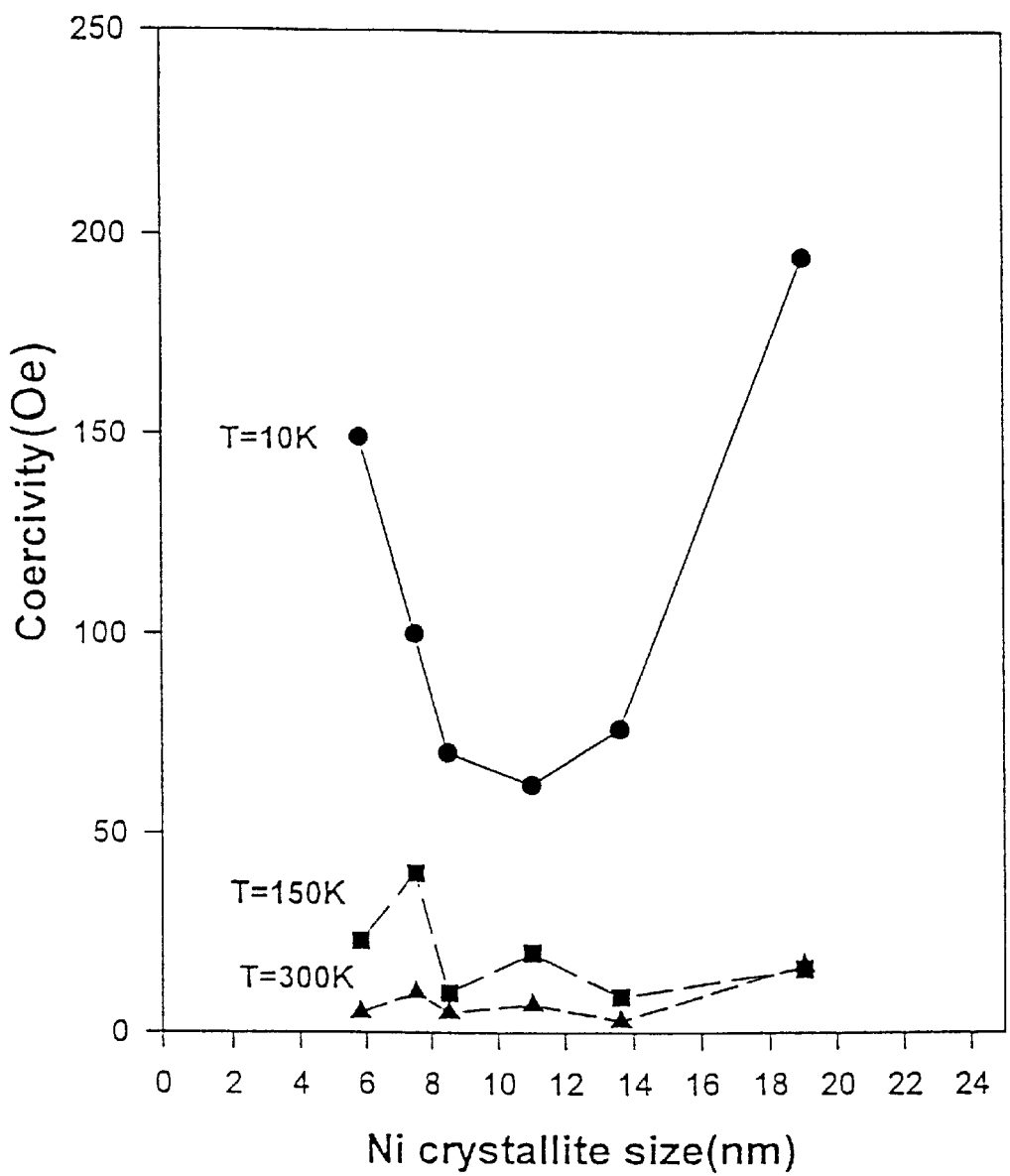
FIG. 23 is a graph of magnetic coercivity versus Ni crystallite size for passivated Ni—Mg $F_2$ SMAD particles.

From the above comparison it will be appreciated that the XRD and TEM sizes correspond with one another. The magnetic properties of these materials are listed in Tables 15 and 16, and FIGS. 22 and 23 also illustrate these results.

TABLE 15

Saturation Magnetization Values of Ni-MgF$_2$ Particles

| Heat Treatment Temperature (°C.) | XRD Ni Size (nm) | TEM Ni Size (nm) | Saturation Magnetization Values (emu/g of Ni) at Different Temperatures (K) | | | | |
|---|---|---|---|---|---|---|---|
| | | | 10K | 77K | 150K | 220K | 300K |
| Fresh, as-prepared | 5.8 | | 25.8 | 22.2 | 20.6 | 19.2 | 17.4 |
| 200 | 7.5 | 7 | 24.0 | 21.2 | 18.7 | 17.1 | 16.2 |
| 300 | 8.5 | 5–10 | 31.0 | 26.5 | 24.8 | 23.3 | 21.4 |
| 400 | 11.0 | 10 | 39.2 | 37.2 | 35.8 | 34.4 | 32.1 |
| 500 | 13.6 | 10–15 | 46.5 | 45.1 | 44.0 | 42.7 | 40.6 |
| 600 | 19.0 | 15–25 | 50.0 | 48.3 | 47.5 | 46.3 | 44.4 |

TABLE 16

Magnetic Coercivities of Ni-MgF$_2$ Particles

| Heat Treatment Temperature (°C.) | XRD Ni Size (nm) | TEM Ni Size (nm) | Coercivity Values (Oe) of Ni-MgF$_2$ Particles at Different Temperatures (K) | | |
|---|---|---|---|---|---|
| | | | 10K | 150K | 300K |
| Fresh, as-prepared | 5.8 | | 149 | 23 | 5.0 |
| 200 | 7.5 | 7 | 100 | 40 | 10 |
| 300 | 8.5 | 5–10 | 70 | 10 | 5.0 |
| 400 | 11.0 | 10 | 62 | 20 | 7.0 |
| 500 | 13.6 | 10–15 | 76 | 9.0 | 3.0 |
| 600 | 19.0 | 15–25 | 194 | 16 | 17 |

EXAMPLE 6

A sample of 0.5 g polystyrene resin (plastic) was dissolved in 15 mL of toluene in a 25 mL beaker and 0.3 g of Fe—Mg composite particles (50–60 nm diameter overall size, iron crystallite size 16 nm) was added with stirring (37% by weight composite particle loading) followed by 3 minutes of sonication in a conventional sonicator-cleaner. Some of the toluene evaporated at room temperature until the slurry became viscous. Then the mixture was poured into an approximately 3" diameter circular mold, and the toluene allowed to evaporate completely leaving a black, thin disk having a thickness of about 10 thousandths of an inch. The resulting disk was rigid if left in contact with the mold. However, it could be peeled off giving a flexible disk and cut into lengths of tape.

After magnetization with a hand-held permanent magnet, the magnetized tape was studied using a Hall probe. A 400–1000 milliGauss signal was detected. The magnetization direction was reversed, and again a 400–1000 milliGauss signal was detected.

For a comparison, a normal commercial magnetic tape was measured for remnant magnetization, which showed a signal of about 500 milliGauss.

In another series of tests, several magnet tapes were fabricated by encapsulating Fe—Mg magnetic particles in accordance with the invention in polystyrene binder, as described above. The composite particle loading ranged from 5–40% by weight. For example, a 5% loading yielded a 40–80 milliGauss reading on the Hall probe.

We claim:

1. A composite comprising a particle having a diameter of from about 5–500 nm with an elemental metal core surrounded by a metal-containing shell material, said core and shell material being thermodynamically immiscible and each being evaporable at a temperature of up to about 2000° C. under a vacuum, said shell material being selected from the group consisting of In, Nd, and metal salts wherein the metal moiety of such salts is different than said core metal.

2. The composite of claim 1, said core metal being present at a level of at least about 30% by weight, and said shell material being present at a level up to about 70% by weight.

3. The composite of claim 1, said core metal being selected from the group consisting of the transition metals.

4. The composite of claim 3, said core metal being selected from the group consisting of Al, Mg, Cr, Fe, Co, Ni, Pd, Au, Cu and Ag.

5. The composite of claim 1, said metal salts being selected from the group consisting of the metal oxides and metal halides.

6. The composite of claim 1, said composite being formed by co-condensation of vapors of said core elemental metal and said metallic shell material, followed by heating of the condensate.

7. A composite comprising a particle having a diameter of from about 5–500 nm with an elemental metal core surrounded by a metal-containing shell material, said core and shell material being thermodynamically immiscible and each being evaporable at a temperature of up to about 2000° C. under a vacuum, said shell material being selected from the group consisting of metal oxide and metal halide salts.

8. The composite of claim 7, said shell material being magnesium fluoride.

9. The composite of claim 7, said core metal being present at a level up to about 30% by weight, and said shell material being present at a level up to about 70% by weight.

10. The composite of claim 7, said core metal being selected from the group consisting of the transition metals.

11. The composite of claim 10, said core metal being selected from the group consisting of Al, Mg, Cr, Fe, Co, Ni, Pd, Au, Cu and Ag.

12. The composite of claim 7, said composite being formed by co-condensation of vapors of said core elemental metal and said metallic shell material, followed by heating of the condensate.

13. A composite comprising a particle having a diameter of from about 5–500 nm with an elemental metal core surrounded by a metal-containing shell material, said core and shell material being thermodynamically immiscible and each being evaporable at a temperature of up to about 2000° C. under a vacuum, said core material being selected from the group consisting of Al, Mg, Co, Ni, Cr, Pd, Au, Cu and Ag, said shell material being selected from the group consisting of the metal sulfide and metal halide salts.

14. The composite of claim 13, said metal halide salts being the metal fluoride salts.

15. A composite comprising a particle having a diameter of from about 5–500 nm with an elemental metal core surrounded by a metal-containing shell material, said core and shell material being thermodynamically immiscible and each being evaporable at a temperature of up to about 2000° C. under a vacuum, said shell material being selected from the group consisting of the metal halide salts.

16. The composite of claim 15, said core metal being iron and said shell material being magnesium fluoride.

17. Magnetic recording media comprising a substrate material having a magnetic coating applied to at least one face thereof, said magnetic coating including a synthetic resin binder with magnetizable particles embedded therein, said magnetizable particles comprising composite particles having an average diameter of from about 5–500 nm with an elemental metal core surrounded by a metal-containing shell material, said core and shell material being thermodynamically immiscible and each being evaporable at a temperature of up to about 2000° C. under a vacuum, said magnetizable particles having two stable opposite magnetic poles switchable under the influence of an externally applied magnetic field.

18. The media of claim 17, said core metal of said particles being present at a level of up to about 30 by weight, and said shell material being present at a level of up to about 70% by weight.

19. The media of claim 17, said core metal being selected from the group consisting of the magnetizable transition metals.

20. The media of claim 19, said core metal being selected from the group consisting of Ni, Fe, Cr and Co.

21. The media of claim 17, said metallic shell material being selected from the group consisting of the elemental metals and metal salts.

22. The media of claim 21, said shell material being selected from the group consisting of elemental lithium, magnesium and gold, and magnesium fluoride.

23. The media of claim 17, said composite being formed by co-condensation of vapors of said core elemental metal and said metallic shell material, followed by heating of the condensate.

24. The media of claim 17, said media being a flexible magnetic recording tape, said substrate material comprising an elongated web of synthetic resin material.

25. The media of claim 17, said media comprising a rigid magnetic disk.

26. The media of claim 17, said magnetic coating comprising from about 1–80% by weight of said magnetizable particles within said synthetic resin binder.

27. A composite comprising a particle having a diameter of from about 5–500 nm with an elemental metal core surrounded by a metal-containing shell material, said core and shell material being thermodynamically immiscible and each being evaporable at a temperature of up to about 2000°

C. under a vacuum, said shell material being selected from the group consisting of In, Nd, and metal salts, said composite being formed by co-condensation of vapors of said core elemental metal and said metallic shell material, followed by heating of the condensate.

28. A magnetic coating adapted for application to a substrate to form magnetic recording media, said coating comprising magnetizable particles dispersed within a synthetic resin binder, said magnetizable particles comprising composite particles having an average diameter of from about 5–500 nm with an elemental metal core surrounded by a metal-containing shell material, said core and shell material being thermodynamically immiscible and each being evaporable at a temperature of up to about 2000° C. under a vacuum, said magnetizable particles having two stable opposite magnetic poles switchable under the influence of an externally applied magnetic field.

29. The coating of claim 28, said core metal of said particles being present at a level of up to about 30% by weight, and said shell material being present at a level of up to about 70% by weight.

30. The coating of claim 28, said core metal being selected from the group consisting of the magnetizable transition metals.

31. The coating of claim 30, said core metal being selected from the group consisting of Ni, Fe, Cr and Co.

32. The coating of claim 28, said metallic shell material being selected from the group consisting of the elemental metals and metal salts.

33. The coating of claim 32, said shell material being selected from the group consisting of elemental lithium, magnesium and gold, and magnesium fluoride.

34. The coating of claim 28, said composite being formed by co-condensation of vapors of said core elemental metal and said metallic shell material, followed by heating of the condensate.

35. The coating of claim 28, comprising from about 1–80% by weight of said magnetizable particles within said synthetic resin binder.

* * * * *

UNITED STATES PATENT AND TRADEMARK OFFICE
CERTIFICATE OF CORRECTION

| | |
|---|---|
| PATENT NO. : 6,045,925 | Page 1 of 1 |
| DATED : April 4, 2000 | |
| INVENTOR(S) : Kenneth J. Klabunde et al. | |

It is certified that error appears in the above-identified patent and that said Letters Patent is hereby corrected as shown below:

<u>Column 1,</u>
Line 3, please insert the following paragraph:
    -- FEDERALLY SPONSORED RESEARCH/DEVELOPMENT PROGRAM
    This invention was made with government support under Grant CHE90-13930 awarded by the United States Army Research Office. The government has certain rights in the invention. --

Signed and Sealed this

Thirtieth Day of April, 2002

Attest:

JAMES E. ROGAN
*Attesting Officer*     *Director of the United States Patent and Trademark Office*